(12) United States Patent
Sueoka et al.

(10) Patent No.: US 10,704,524 B2
(45) Date of Patent: Jul. 7, 2020

(54) CONTROL SYSTEM OF COMPRESSION-IGNITION ENGINE

(71) Applicant: Mazda Motor Corporation, Aki-gun, Hiroshima (JP)

(72) Inventors: Masanari Sueoka, Hiroshima (JP); Atsushi Inoue, Aki-gun (JP); Keiji Maruyama, Hiroshima (JP); Takuya Ohura, Hiroshima (JP); Tomohiro Nishida, Hiroshima (JP); Yusuke Kawai, Hiroshima (JP); Tetsuya Chikada, Higashihiroshima (JP); Tatsuhiro Tokunaga, Aki-gun (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 16/415,658

(22) Filed: May 17, 2019

(65) Prior Publication Data

US 2019/0360451 A1 Nov. 28, 2019

(30) Foreign Application Priority Data

May 22, 2018 (JP) ................................ 2018-097823

(51) Int. Cl.
*F02D 13/02* (2006.01)
*F02D 41/30* (2006.01)
(Continued)

(52) U.S. Cl.
CPC ................ *F02P 5/045* (2013.01); *F01L 1/34* (2013.01); *F02B 1/08* (2013.01); *F02B 1/10* (2013.01);
(Continued)

(58) Field of Classification Search
CPC ...... F01L 1/34; F01L 2800/10; F01L 2800/13; F02B 1/08; F02B 1/10; F02D 13/0215;
(Continued)

(56) References Cited

U.S. PATENT DOCUMENTS 6,293,246 B1 9/2001 Tanahashi et al.
6,837,040 B2 * 1/2005 Sonoda ..................... F01L 1/34
123/295

(Continued)

FOREIGN PATENT DOCUMENTS

JP 2009108778 A 5/2009
JP 6249667 B2 12/2017

OTHER PUBLICATIONS

Triantopoulos, V., "Experimental and Computational Investigation of Spark Assisted Compression Ignition Combustion Under Boosted, Ultra EGR-Dilute Conditions," Doctor of Philosophy Dissertation, The University of Michigan, Department of Mechanical Engineering, 2018, 238 pages.

(Continued)

*Primary Examiner* — Erick R Solis
(74) *Attorney, Agent, or Firm* — Alleman Hall Creasman & Tuttle LLP

(57) ABSTRACT

A control system of a compression-ignition engine which performs SPCCI combustion in which mixture gas is ignited with a spark plug to be partially combusted by SI combustion and the rest of mixture gas self-ignites to be combusted by CI combustion, is provided. When the engine is operated at least in a given first operating range, a controller of the device controls a variable intake mechanism so that an A/F lean environment where an air-fuel ratio in a cylinder becomes higher than a stoichiometric air-fuel ratio is formed, while causing the spark plug to perform spark ignition at a given timing so that the mixture gas combusts by SPCCI combustion, and controls so that, under the same (Continued)

engine load condition, an intake valve close timing is more retarded as the engine speed decreases, within a range where an amount of air inside the cylinder decreases by retarding the close timing.

9 Claims, 15 Drawing Sheets

(51) Int. Cl.
*F02P 5/04* (2006.01)
*F02D 13/06* (2006.01)
*F02D 41/00* (2006.01)
*F02P 5/15* (2006.01)
*F01L 1/34* (2006.01)
*F02B 1/08* (2006.01)
*F02B 1/10* (2006.01)
*F02B 31/08* (2006.01)

(52) U.S. Cl.
CPC ..... *F02D 13/0215* (2013.01); *F02D 13/0219* (2013.01); *F02D 13/0261* (2013.01); *F02D 13/06* (2013.01); *F02D 41/0087* (2013.01); *F02P 5/1502* (2013.01); *F01L 2800/13* (2013.01); *F02B 31/085* (2013.01); *F02D 2200/101* (2013.01)

(58) Field of Classification Search
CPC ............. F02D 13/0219; F02D 13/0261; F02D 41/3029; F02D 41/3041; F02D 2200/101
USPC ........................................ 123/295, 299, 305
See application file for complete search history.

(56) References Cited

U.S. PATENT DOCUMENTS

| | | | | |
|---|---|---|---|---|
| 7,337,762 B2* | 3/2008 | Eng | .......................... | F01L 1/34 |
| | | | | 123/295 |
| 7,360,523 B2* | 4/2008 | Sloane | ................... | F02B 17/005 |
| | | | | 123/305 |
| 7,431,011 B2* | 10/2008 | Wagner | ............... | F02D 13/0261 |
| | | | | 123/299 |
| 9,140,199 B2* | 9/2015 | Mond | ..................... | F02D 23/00 |
| 2002/0029757 A1* | 3/2002 | Ogawa | ...................... | F01L 1/34 |
| | | | | 123/295 |
| 2003/0062023 A1* | 4/2003 | Fuerhapter | ................ | F01L 1/34 |
| | | | | 123/306 |
| 2009/0093946 A1* | 4/2009 | Yamashita | ................ | F01L 1/08 |
| | | | | 701/103 |
| 2018/0334998 A1* | 11/2018 | Inoue | .................. | F02B 23/0696 |
| 2019/0360449 A1* | 11/2019 | Inoue | .................... | F02D 41/005 |

OTHER PUBLICATIONS

Szybist, J et al., "Load Expansion of Stoichiometric HCCI Using Spark Assist and Hydraulic Valve Actuation," SAE International, Oct. 25, 2010, 15 pages.
Hakan, P., "Spark Assisted Compression Ignition, SACI," Doctoral Thesis, Division of Combustion Engines, Lund University, 2008, 164 pages.
European Patent Office, Extended European Search Report Issued in Application No. 19174813.6, dated Oct. 22, 2019, Germany, 28 pages.

* cited by examiner

CONTROL SYSTEM OF COMPRESSION-IGNITION ENGINE

TECHNICAL FIELD

The present disclosure relates to a control system of a compression-ignition engine, which is capable of carrying out a partial compression-ignition combustion in which a mixture gas within a cylinder is partially combusted by spark-ignition (SI combustion) and then the remaining mixture gas is combusted by self-ignition (CI combustion).

BACKGROUND OF THE DISCLOSURE

In recent years, Homogeneous-Charge Compression Ignition (HCCI) combustion in which a gasoline fuel mixed with air combusts by self-ignition inside a fully-compressed combustion chamber has attracted attention. Since the HCCI combustion is a form in which the mixture gas combusts simultaneously without flame propagation, the combusting speed of the mixture gas is faster than the SI combustion (jump-spark-ignition combustion) which is adopted by normal gasoline engines. Therefore, it is said that the HCCI combustion is very advantageous in terms of thermal efficiency. However, it is necessary to solve various problems of automobile engines which require an improvement in thermal efficiency, and engines which operate by a suitable HCCI combustion have not yet been put into practical use. That is, although the engines mounted on automobiles vary largely in the operating state and the environmental condition, the HCCI combustion has a problem in which a combustion start timing of the mixture gas (timing at which the mixture gas self-ignites) changes largely by external factors, such as temperature, and also has a problem in which control during a transition operation in which load changes suddenly is difficult.

Thus, it is proposed that, without combusting all of the mixture gas by self-ignition, a portion of the mixture gas is combusted by the spark ignition using a spark plug. That is, a portion of the mixture gas is forcibly combusted by flame propagation (SI combustion) triggered by the spark ignition, and the remaining mixture gas is combusted by self-ignition (CI combustion). Hereinafter, such combustion is referred to as "SPCCI (SPark Controlled Compression-Ignition) combustion."

JP2009-108778A is known as one example of an engine adopting a concept similar to the SPCCI combustion. This engine carries out flame-propagation combustion by the spark ignition, of a stratified mixture gas formed around a spark plug (ignition plug) by a supplementary fuel injection, and then carries out a main fuel injection into a combustion chamber which reaches a high temperature by the effect of the flame-propagation combustion (flame) to cause the fuel injected by the main fuel injection to combust by self-ignition.

The CI combustion of the SPCCI combustion takes place when an in-cylinder temperature (temperature inside a cylinder) reaches an ignition temperature of the mixture gas which is defined by the composition of the mixture gas. Fuel efficiency can be maximized if the CI combustion occurs by the in-cylinder temperature reaching the ignition temperature near a compression top dead center. The in-cylinder temperature increases with an increase in an in-cylinder pressure (pressure inside the cylinder). The in-cylinder pressure on the compression stroke when the SPCCI combustion is carried out is increased by compression work of a piston and combustion energy of the SI combustion. Therefore, if the flame propagation of the SI combustion is not stable, increasing amounts of the in-cylinder pressure and the in-cylinder temperature resulting from the SI combustion decreases, and it becomes difficult to raise the in-cylinder temperature to the ignition temperature. If the in-cylinder temperature does not fully rise to the ignition temperature, more of the mixture gas combusts by flame propagation with a long combustion period because of a reduction in the amount of the mixture gas which carries out the CI combustion, or the CI combustion takes place when the piston descends considerably, and as a result, fuel efficiency decreases. Thus, in order to cause the stable CI combustion to maximize fuel efficiency, it is important to stabilize the flame propagation of the SI combustion.

In addition, the SPCCI combustion also requires improvements in fuel efficiency and exhaust performance, by turning the combustion chamber into an air-fuel ratio (A/F) lean environment in which an air-fuel ratio which is a ratio of air to fuel inside the cylinder becomes higher than a stoichiometric air-fuel ratio. However, in such an A/F lean environment, it becomes difficult to stabilize the flame propagation of the SI combustion.

SUMMARY OF THE DISCLOSURE

The present disclosure is made in view of the above situations, and one purpose thereof is to provide a control system of a compression-ignition engine, which can realize a suitable partial compression-ignition combustion under an A/F lean environment.

In order to address the situations, the present inventors diligently examined a more suitable control of an intake valve by changing a close timing of the intake valve, while causing the SPCCI combustion with various engine speeds. As a result, the present inventors determined that stable SPCCI combustion can be realized, within a wide engine speed range, even under the A/F lean environment by retarding the close timing of the intake valve at a low engine speed side to reduce the air amount inside the cylinder, and advancing the close timing of the intake valve at a high engine speed side.

According to one aspect of the present disclosure, a control system of a compression-ignition engine is provided. The engine includes a cylinder, an intake passage, an exhaust passage, an intake port communicating the intake passage to the cylinder, an intake valve configured to open and close the intake port, an exhaust port communicating the exhaust passage to the cylinder, an exhaust valve configured to open and close the exhaust port, an injector configured to inject fuel into the cylinder, and a spark plug configured to ignite a mixture gas containing the fuel injected by the injector and air. The engine performs partial compression-ignition combustion in which the mixture gas is spark-ignited with the spark plug to be partially combusted by spark ignition (SI) combustion and the remaining mixture gas self-ignites to be combusted by compression ignition (CI) combustion. The control system includes a variable intake mechanism configured to change an open timing and a close timing of the intake valve, and a controller including a processor configured to control parts of the engine, including the variable intake mechanism and the spark plug. When the engine is operated at least in a given first operating range, the controller controls the variable intake mechanism so that an air-fuel ratio (A/F) lean environment where an air-fuel ratio that is a ratio of air to fuel in the cylinder becomes higher than a stoichiometric air-fuel ratio is formed, while causing the spark plug to perform spark ignition at a given timing so that the mixture gas combusts by the partial compression-ignition combustion, and the controller controls the variable intake mechanism so that, under the same engine load condition, the close timing of the intake valve is more retarded as the engine speed decreases, within a range where an amount of air inside the cylinder decreases by retarding the valve close timing.

According to this configuration, in the first operating range, a stable partial compression-ignition combustion (SPCCI combustion) is realized, while the air-fuel ratio is set higher than the stoichiometric air-fuel ratio. Therefore, fuel efficiency can certainly be improved.

Specifically, with this configuration, in the first operating range where the SPCCI combustion is performed under the A/F lean environment, the close timing of the intake valve is more retarded as the engine speed decreases, within the range where the amount of air inside the cylinder decreases by retarding the valve close timing. Thus, when it is difficult to increase the in-cylinder temperature under the A/F lean environment because the engine speed is low and the number of combustions per unit time is small, the air-fuel ratio in the cylinder is reduced (richer) so that the stable SI combustion, as well as the suitable CI combustion and the SPCCI combustion, are realized. Further, when the engine speed is high, by securing the amount of air inside the cylinder and making the air-fuel ratio inside the cylinder lean, fuel efficiency and torque performance are improved.

The variable intake mechanism may simultaneously change the open timing and the close timing of the intake valve.

The controller may control the variable intake mechanism and the spark plug so that the partial compression-ignition combustion under the A/F lean environment is performed when the engine is operated in a second operating range set to the high load side of the first operating range. The controller may control the variable intake mechanism so that the close timing of the intake valve is more retarded as the engine speed increases under the same engine load condition, and a rate of change in the valve close timing becomes smaller than the rate of change in the first operating range, or control the variable intake mechanism so that the close timing of the intake valve is fixed, regardless of the engine speed.

In the second operating range, the engine load is relatively high and the combustion stability is easily secured. In such a second operating range, unlike the first operating range, it is not necessary to retard the close timing of the intake valve with respect to the engine speed. Therefore, with the configuration described above, in the second operating range, fuel efficiency is improved by making the amount of air and the air-fuel ratio inside the cylinder larger while combustion stability is secured.

The controller may control the variable intake mechanism and the spark plug so that the partial compression-ignition combustion under the A/F lean environment is performed when the engine is operated in a third operating range set to a higher load side of the second operating range. The controller may control the variable intake mechanism in a partial range of the third operating range where the engine speed is higher so that the close timing of the intake valve is more retarded as the engine speed increases, within a range where the amount of air inside the cylinder increases by retarding the valve close timing.

According to this configuration, in the high engine speed range of the third operating range where the engine speed is high and the inertia of intake air is usable, the air introduction into the cylinder is stimulated and the air-fuel ratio of the mixture gas is increased certainly to be higher than the stoichiometric air-fuel ratio.

The controller may control the variable intake mechanism in a partial range of the third operating range where the engine speed is lower, so that the close timing of the intake valve is fixed, regardless of the engine speed, or so that the close timing of the intake valve is advanced as the engine speed increases.

The control system may further include a variable exhaust mechanism configured to change a close timing of the exhaust valve. The controller may control the variable exhaust mechanism so that, when the engine is operated in the first operating range, the close timing of the exhaust valve is more advanced within a range on a retarded side of an exhaust top dead center as the engine speed decreases.

When the close timing of the exhaust valve is advanced within the range on the retarded side of the exhaust top dead center, the amount of burnt gas reintroduced into the cylinder after being drawn out to the exhaust port decreases. Therefore, according to this configuration, in the range on the low load side where the combustion easily becomes unstable, the amount of burnt gas which remains in the cylinder is reduced to stimulate a reaction of fuel and air. Therefore, combustion stability can further be improved. Moreover, the amount of burnt gas remaining in the cylinder is prevented from becoming excessively low when the engine speed is high and the combustion temperature is prevented from becoming high.

The cylinder may include a plurality of cylinders. The controller may control the variable intake mechanism so that, when the engine is operated in a reduced cylinder range set as at least part of the first operating range, and a preset reduced-cylinder operation executing condition is satisfied, a reduced-cylinder operation is carried out in which only some of the cylinders are operated by injecting fuel from the injector into the cylinders, while suspending the fuel injection into the remaining cylinders, and when the reduced-cylinder operation is carried out within a higher load range of the reduced cylinder range, the close timing of the intake valve is more retarded as the engine speed increases within a range where the amount of air inside the cylinder increases by retarding the valve close timing.

When the reduced-cylinder operation is carried out, since the fuel amount to be supplied to the cylinder (operating cylinder) is increased more than in an all-cylinder operation under the same engine load condition, the temperature in the operating cylinder is increased and combustion stability is improved. Therefore, according to this configuration, by carrying out the reduced-cylinder operation, the combustion is prevented from becoming unstable in the reduced cylinder range set to at least part of the first operating range.

Further, since the fuel amount to be supplied to the cylinder increases when carrying out the reduced-cylinder operation and the engine load is relatively high, the amount of air introduced into the operating cylinder needs to be increased. In this regard, according to this configuration, in a case where the reduced-cylinder operation is carried out within the higher load range of the reduced cylinder range, the close timing of the intake valve is more retarded as the engine speed increases within the range where the amount of air inside the cylinder increases by retarding the valve close timing. Thus, in the described case and in the high speed range where the inertia of intake air is usable, the air introduction into the cylinder can be stimulated.

The controller may control the variable exhaust mechanism configured to change the close timing of the exhaust valve so that, when the reduced-cylinder operation is carried out in a higher load range of the reduced cylinder range, the close timing of the exhaust valve is more advanced as the engine speed increases within a range on a retarded side of an exhaust top dead center.

According to this configuration, in a case where the reduced-cylinder operation is carried out in the higher load range of the reduced cylinder range and it is necessary to introduce large amount of air into the operating cylinder, by retarding the close timing of the exhaust valve within the range on the retarded side of the exhaust top dead center, the amount of burnt gas reintroduced from the exhaust port into the cylinder can be reduced. Therefore, air flow from the intake port into the cylinder can be stimulated so that the air amount inside cylinder can reliably be increased.

The controller may set a target SI ratio that is a target value of a ratio of an amount of heat generation by the SI combustion to a total amount of heat generation in one cycle according to an engine operating condition when performing the partial compression-ignition combustion, and set an ignition timing of the spark plug based on the target SI ratio.

By adjusting the ignition timing so as to realize the SPCCI combustion conforming to the target SI ratio, for example, the ratio of the CI combustion can be increased (i.e., the SI ratio is lowered). This leads to improving thermal efficiency by the SPCCI combustion as much as possible.

DETAILED DESCRIPTION OF THE DISCLOSURE (1) Entire Configuration of Engine

Figure 1:
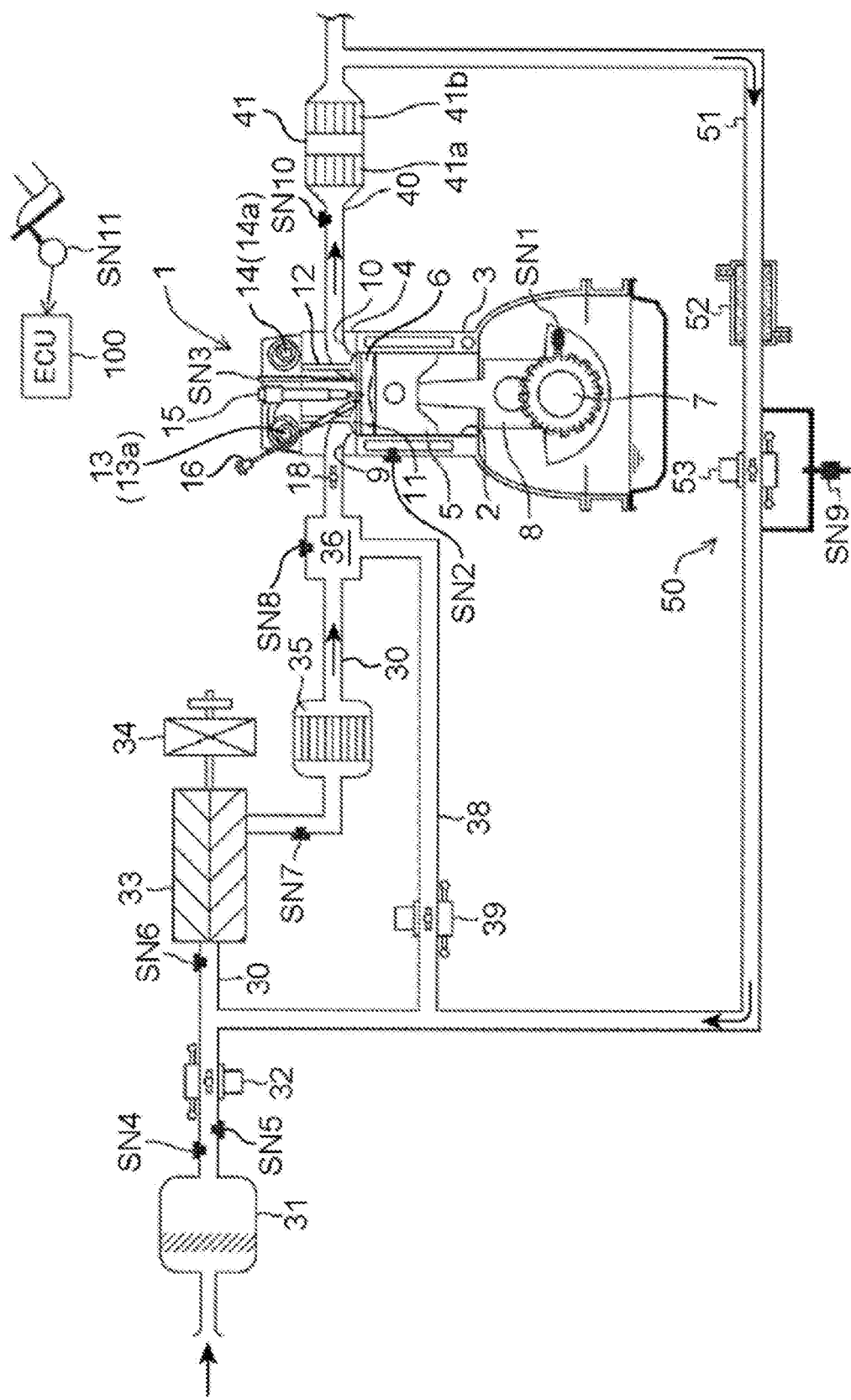
FIG. 1 is a system diagram schematically illustrating the entire configuration of a compression-ignition engine according to one embodiment of the present disclosure.
Figure 2:
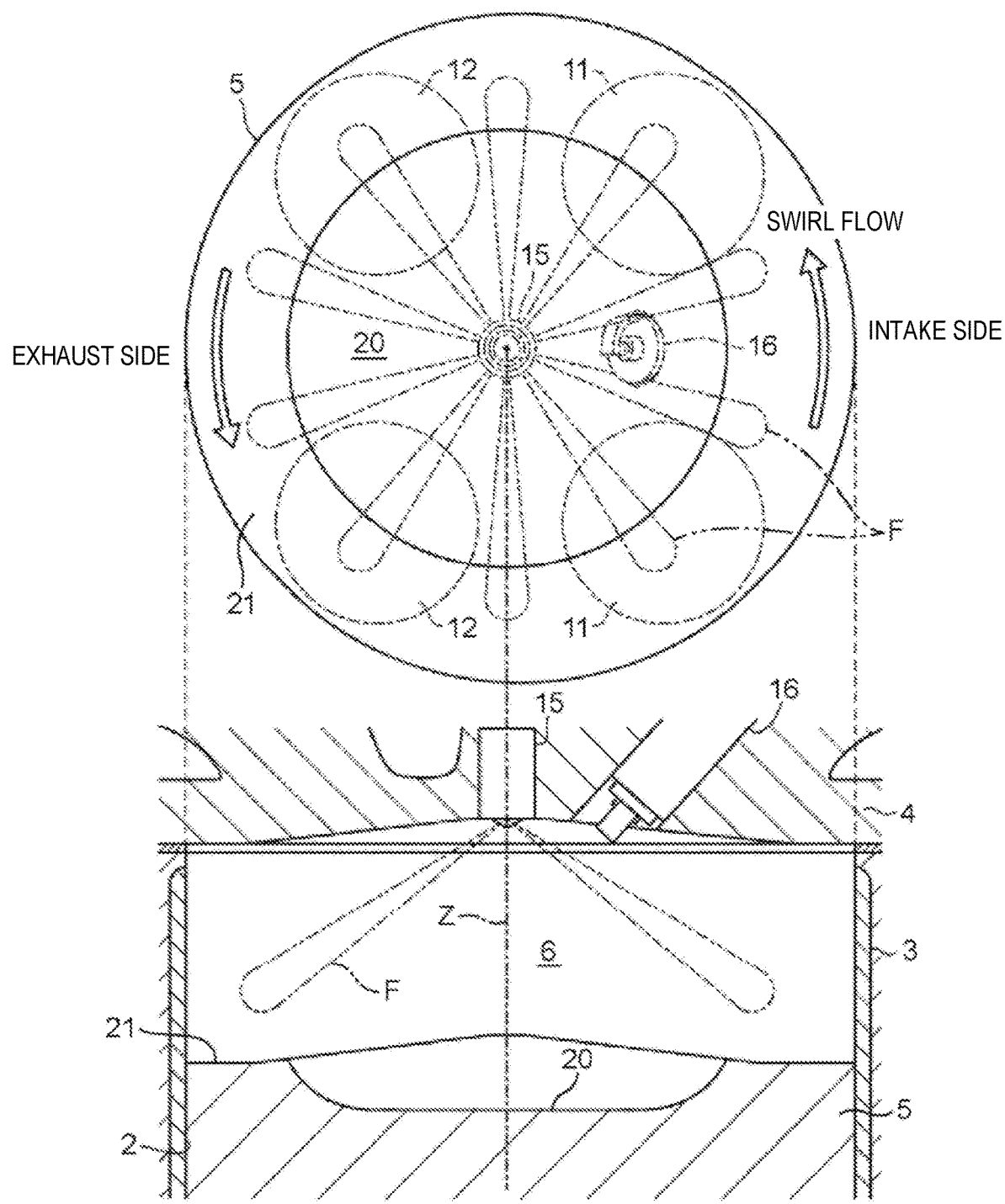
FIG. 2 is a view illustrating both a cross-sectional view of an engine body and a plan view of a piston.

FIGS. 1 and 2 are views illustrating a desirable embodiment of a compression-ignition engine (hereinafter, simply referred to as "the engine") to which a control system of the present disclosure is applied. An engine illustrated in these figures is a four-cycle gasoline direct-injection engine mounted on a vehicle, as a power source for propulsion, and includes an engine body 1, an intake passage 30 through which intake air introduced into the engine body 1 flows, an exhaust passage 40 through which exhaust gas discharged from the engine body 1 flows, and an external exhaust gas recirculation (EGR) system 50 which recirculates to the intake passage 30 part of the exhaust gas flowing through the exhaust passage 40.

The engine body 1 includes a cylinder block 3 where a cylinder 2 is formed therein, a cylinder head 4 attached to an upper surface of the cylinder block 3 so as to cover the cylinder 2 from above, and a piston 5 reciprocatably inserted in the cylinder 2. Although the engine body 1 is typically of a multi-cylinder type having a plurality of cylinders (for example, four cylinders), the following description may be focused on only one cylinder 2 in order to simplify the description.

A combustion chamber 6 is defined above the piston 5, and fuel of which the main component is gasoline is supplied to the combustion chamber 6 by injection from an injector 15 described later. Then, the supplied fuel combusts inside the combustion chamber 6 while being mixed with air, and the piston 5 descends by an expansion force caused by the combustion reciprocates in the up-and-down direction. Note that the fuel injected into the combustion chamber 6 may contain at least gasoline as the main component, and for example, may also contain a subcomponent, such as bioethanol, in addition to gasoline.

Below the piston 5, a crankshaft 7 which is an output shaft of the engine body 1 is provided. The crankshaft 7 is coupled to the piston 5 through a connecting rod 8, and is rotated about a center axis thereof according to the reciprocating motion (up-and-down motion) of the piston 5.

A geometric compression ratio of the cylinder 2, i.e., a ratio with the volume of the combustion chamber 6 when the piston 5 is located at a bottom dead center to the volume of the combustion chamber 6 when the piston 5 is located at a top dead center is set to 13 or higher and 30 or lower, and preferably, 14 or higher and 18 or lower, as a suitable value for SPCCI (SPark Controlled Compression Ignition) combustion described later. In more detail, the geometric compression ratio of the cylinder 2 is desirably set to 14 or higher and 17 or lower in a case of a regular gasoline type which uses gasoline fuel of which the octane number is about 91, and 15 or higher and 18 or lower in a case of a high octane type which uses gasoline fuel of which the octane number is about 96.

The cylinder block 3 is provided with a crank angle sensor SN1 which detects a rotational angle of the crankshaft 7 (crank angle) and an engine speed of the crankshaft 7 (engine speed), and a water temperature sensor SN2 which detects temperature of coolant which flows inside the cylinder block 3 and the cylinder head 4 (engine water temperature).

The cylinder head 4 is provided with an intake port 9 which opens to the combustion chamber 6 and communicates with the intake passage 30, an exhaust port 10 which opens to the combustion chamber 6 and communicates with the exhaust passage 40, an intake valve 11 which opens and closes the intake port 9, and an exhaust valve 12 which opens and closes the exhaust port 10. Note that as illustrated in FIG. 2, the valve type of the engine of this embodiment is a four-valve type with two intake valves and two exhaust valves. That is, the intake port 9 has a first intake port 9A and a second intake port 9B, and the exhaust port 10 has a first exhaust port 10A and a second exhaust port 10B (see FIG. 3). One intake valve 11 is provided to each of the first intake port 9A and the second intake port 9B, and one exhaust valve 12 is provided to each of the first exhaust port 10A and the second exhaust port 10B.

Figure 3:
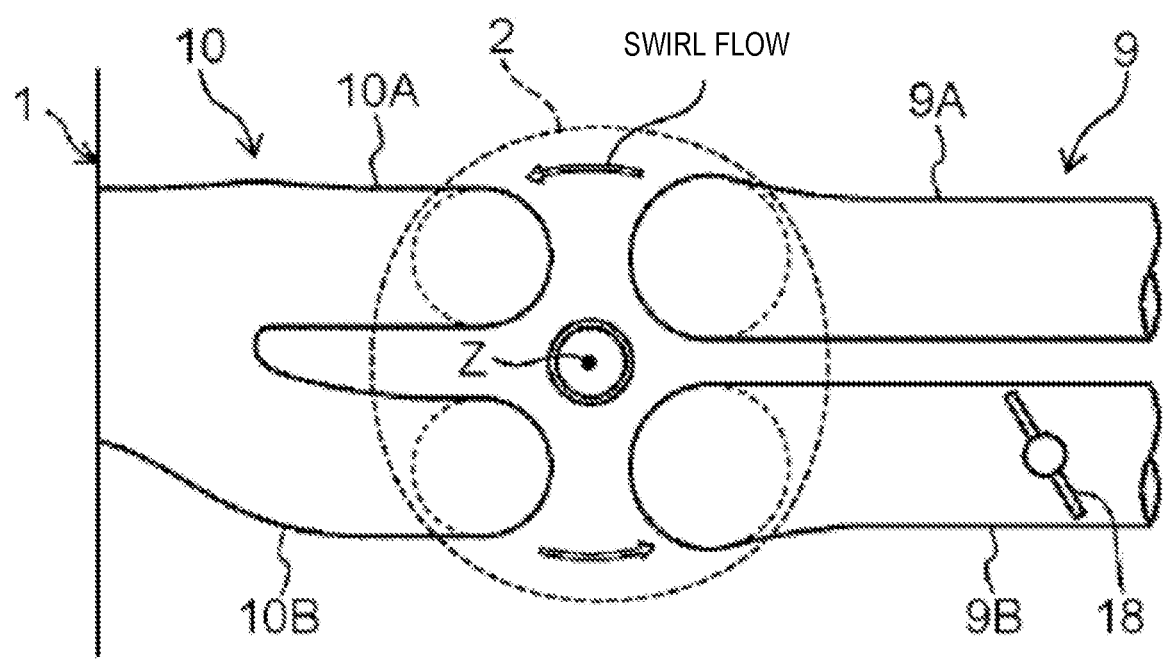
FIG. 3 is a plan view schematically illustrating a structure of a cylinder, and intake and exhaust systems nearby.

As illustrated in FIG. 3, a swirl valve 18 which can open and close is provided to the second intake port 9B. The swirl valve 18 is provided only to the second intake port 9B, and is not provided to the first intake port 9A. Since a ratio of the intake air flowing into the combustion chamber 6 from the first intake port 9A which is not provided with the swirl valve 18 increases when the swirl valve 18 is driven in a closing direction, a rotational flow which circles around a cylinder axis Z (a center axis of the combustion chamber 6), i.e., a swirl flow, can be strengthened. On the contrary, the swirl flow can be weakened when the swirl valve 18 is driven in an opening direction. Note that the intake port 9 of this embodiment is a tumble port which can form a tumble flow (vertical vortex). Thus, the swirl flow formed when the swirl valve 18 is closed turns into an inclined swirl flow mixed with the tumble flow.

The intake valve 11 and the exhaust valve 12 are driven by valve operating mechanisms 13 and 14 including a pair of cam shafts disposed in the cylinder head 4, in an interlocked manner with the rotation of the crankshaft 7, so that the valves are opened and closed.

An intake variable valve timing mechanism (VVT) 13a configured to change an open timing and a close timing of the intake valve 11 is built in the valve operating mechanism 13 for the intake valve 11. Similarly, an exhaust VVT 14a configured to change an open timing and a close timing of the exhaust valve 12 is built in the valve operating mechanism 14 for the exhaust valve 12. The intake VVT 13a (exhaust VVT 14a) is a so-called phase-variable mechanism, which changes the open timing and the close timing of the intake valve 11 (exhaust valve 12) simultaneously and by the same amount. That is, the open timing and the close timing of the intake valve 11 (exhaust valve 12) are changed in a state in which the valve opening period is fixed to a certain length. The intake VVT 13a described above is one example of an "intake variable mechanism" and the exhaust VVT 14a is one example of an "exhaust variable mechanism."

The open timing of the intake valve 11 can be changed between a given timing on the retarded side of a top dead center (TDC) of an exhaust stroke and a given timing at the advanced side of the exhaust TDC. The valve opening period of the intake valve 11 is set so that a close timing IVC of the intake valve 11 becomes a timing on the retarded side of a bottom dead center (BDC) of an intake stroke, when the open timing IVO of the intake valve 11 is set at the maximum advanced timing (the most advanced timing within the possible timing range). In connection with this, the close timing IVC of the intake valve 11 is changed within a range on the retarded side of the intake BDC. An open timing EVO of the exhaust valve 12 can be changed between the given timing at the advanced side of the exhaust TDC and the given timing on the retarded side of the exhaust TDC.

Note that the open timing of the intake valve 11 (exhaust valve 12) described herein does not refer to a timing at which a valve lift becomes greater than zero (0), but a timing at which a flow of gas between the intake port 9 (exhaust port) and the combustion chamber 6 via the intake valve 11 (exhaust valve 12) begins to become substantially possible. For example, the valve lift of the intake valve 11 (exhaust valve 12) rises rapidly after it is lifted at a substantially constant speed from a seated state (i.e., after passing a so-called "ramp part"), and the open timing of the intake valve 11 (exhaust valve 12) described herein refers to the timing at which the valve lift rises rapidly. This timing is when the valve lift of the intake valve 11 (exhaust valve 12) becomes about 0.14 mm, for example. Similarly, the close timing of the intake valve 11 (exhaust valve 12) described herein is not a timing at which the valve lift of the intake valve 11 (exhaust valve 12) becomes zero, but is a timing at which a flow of gas between the intake port 9 (exhaust-valve port) and the combustion chamber 6 via the intake valve 11 (exhaust valve 12) substantially stops. For example, the valve lift of the intake valve 11 (exhaust valve 12) slowly descends at a substantially constant speed toward zero after it descends relatively quickly (that is, a so-called ramp part is set), and the open timing of the intake valve 11 (exhaust valve 12) described herein is a timing at which the valve lift begins to descend toward zero at the fixed speed. This timing is when the valve lift of the intake valve 11 (exhaust valve 12) becomes about 0.14 mm, for example.

The cylinder head 4 is provided with the injector 15 which injects the fuel (mainly gasoline) into the combustion chamber 6, and a spark plug 16 which ignites the mixture gas which is a mixture of the fuel injected into the combustion chamber 6 from the injector 15 with air introduced into the combustion chamber 6. The cylinder head 4 is further provided with an in-cylinder pressure sensor SN3 which detects pressure of the combustion chamber 6 (hereinafter, may also be referred to as the "in-cylinder pressure").

As illustrated in FIG. 2, a cavity 20 is formed on a crown surface of the piston 5 by denting a relatively wide area including a center part thereof, to the opposite side from the cylinder head 4 (downwardly). Moreover, a squish part 21 comprised of an annular flat surface is formed in the crown surface of the piston 5, radially outward of the cavity 20.

The injector 15 is a multi-port injector having a plurality of nozzle ports at its tip portion, and the fuel is injected radially from the plurality of nozzle ports. "F" in FIG. 2 indicates fuel spray injected from each nozzle port, and the injector 15 has a total of ten nozzle ports formed at equal intervals in the circumferential direction in the example of FIG. 2. The injector 15 is located in a center portion of a ceiling surface of the combustion chamber 6 so that its tip portion opposes to the center portion (the center of the bottom of the cavity 20) of the crown surface of the piston 5.

The spark plug 16 is disposed at a position slightly offset to the intake side with respect to the injector 15. The position of a tip portion (electrode part) of the spark plug 16 overlaps with the cavity 20 in the plan view.

As illustrated in FIG. 1, the intake passage 30 is connected to one of side surfaces of the cylinder head 4 so as to communicate with the intake port 9. Air (fresh air) taken in from an upstream end of the intake passage 30 is introduced into the combustion chamber 6 through the intake passage 30 and the intake port 9.

The intake passage 30 is provided with, in the order from the upstream side, an air cleaner 31 which removes foreign matter contained in the intake air, a throttle valve 32 which can be opened and closed to adjust a flow rate of intake air, a booster 33 which boosts the intake air while compressing the intake air, an intercooler 35 which cools the intake air compressed by the booster 33, and a surge tank 36.

An airflow sensor SN4 which detects the flow rate of the intake air, first and second intake air temperature sensors SN5 and SN7 which detect temperature of the intake air, and the first and second intake air pressure sensors SN6 and SN8 which detect pressure of the intake air are provided in various parts of the intake passage 30. The airflow sensor SN4 and the first intake air temperature sensor SN5 are provided to a portion of the intake passage 30 between the air cleaner 31 and the throttle valve 32, and detect the flow rate and the temperature of intake air passing through this portion. The first intake air pressure sensor SN6 is provided to a portion of the intake passage 30 between the throttle valve 32 and the booster 33 (downstream side of a connection port of an EGR passage 51 described later), and detects the pressure of intake air passing through this portion. The second intake air temperature sensor SN7 is provided to a portion of the intake passage 30 between the booster 33 and the intercooler 35, and detects the temperature of intake air which passes through this portion. The second intake air pressure sensor SN8 is provided in the surge tank 36, and detects the pressure of intake air in the surge tank 36.

The booster 33 is a mechanical booster (supercharger) which is mechanically coupled to the engine body 1. Although the specific type of the booster 33 is not particularly limited, for example, any known booster, for example, such as a Lysholm, Roots type, or centrifugal type, may be used as the booster 33.

Between the booster 33 and the engine body 1, an electromagnetic clutch 34 which can be electrically switched between operation modes of "engaged" and disengaged" is provided. When the electromagnetic clutch 34 is engaged, a driving force is transmitted from the engine body 1 to the booster 33, thereby becoming a boosting state where boost by the booster 33 is performed. On the other hand, when the electromagnetic clutch 34 is disengaged, the transmission of the driving force is interrupted, to enter a non-boosting state where the boost by the booster 33 is stopped.

The intake passage 30 is provided with a bypass passage 38 which bypasses the booster 33. The bypass passage 38 connects the surge tank 36 with the EGR passage 51 described later. The bypass passage 38 is provided with a bypass valve 39 which can be opened and closed.

The exhaust passage 40 is connected to the other side surface of the cylinder head 4 so as to communicate with the exhaust port 10. Burnt gas (exhaust gas) generated in the combustion chamber 6 is discharged outside through the exhaust port 10 and the exhaust passage 40.

The exhaust passage 40 is provided with a catalytic converter 41. The catalytic converter 41 contains a three-way catalyst 41a which purifies hazardous components (HC, CO, and $NO_x$) contained in exhaust gas which flows through the exhaust passage 40, and a GPF (Gasoline Particulate Filter) 41b which captures particulate matter (PM) contained in the exhaust gas. Note that another catalytic converter which contains suitable catalysts, such as a three-way catalyst and a $NO_x$ catalyst, may be additionally provided downstream of the catalytic converter 41.

A linear $O_2$ sensor SN10 which detects the concentration of oxygen contained within the exhaust gas is provided in a portion of the exhaust passage 40 upstream of the catalytic converter 41. The linear $O_2$ sensor SN10 linearly changes its output value according to the oxygen concentration, and can estimate an air-fuel ratio of the mixture gas based on the output value of the linear $O_2$ sensor SN10.

The external EGR system 50 has the EGR passage 51 connecting the exhaust passage 40 to the intake passage 30, and an EGR cooler 52 and an EGR valve 53 provided in the EGR passage 51. The EGR passage 51 connects a portion of the exhaust passage 40 downstream of the catalytic converter 41 to a portion of the intake passage 30 between the throttle valve 32 and the booster 33. The EGR cooler 52 cools exhaust gas recirculated from the exhaust passage 40 to the intake passage 30 through the EGR passage 51 by heat exchange. The EGR valve 53 is provided in the EGR passage 51 downstream of the EGR cooler 52 (the side closer to the intake passage 30), and adjusts the flow rate of the exhaust gas which flows through the EGR passage 51. Hereinafter, the exhaust gas recirculated from the exhaust passage 40 into the combustion chamber 6 (cylinder 2) through the EGR passage 51 is referred to as the external EGR gas.

The EGR passage 51 is provided with a differential pressure sensor SN9 which detects a difference between a pressure upstream of the EGR valve 53 and a pressure downstream of the EGR valve 53.

(2) Control System

Figure 4:
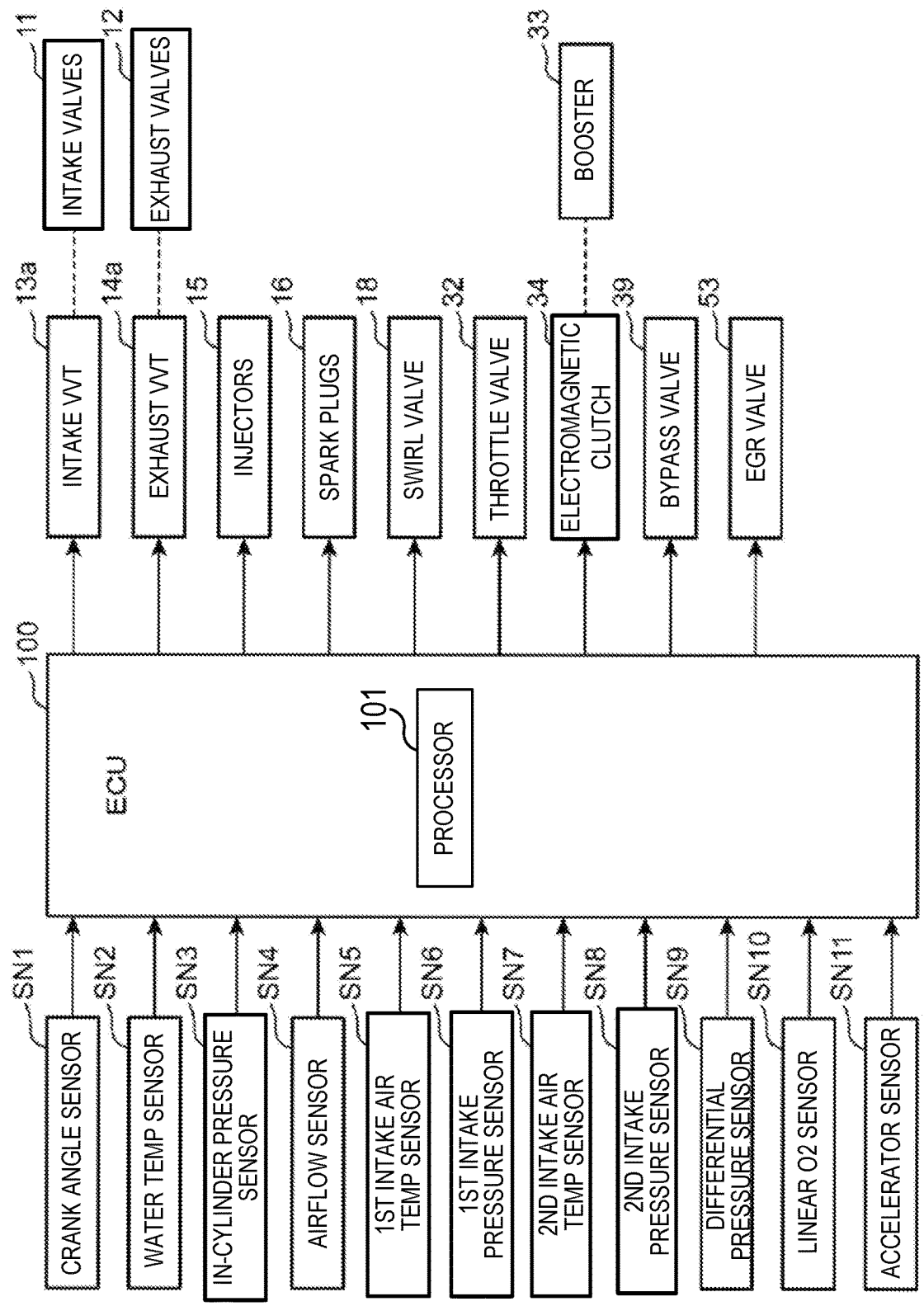
FIG. 4 is a block diagram illustrating an engine control system.

FIG. 4 is a block diagram illustrating an engine control system. An ECU (electronic control unit) 100 illustrated in FIG. 4 is a microprocessor which comprehensively controls the engine, and is comprised of a well known processor 101 (e.g. a central processing unit (CPU)) with associated ROM and RAM.

The ECU 100 receives detection signals from various sensors. For example, the ECU 100 is electrically connected to the crank angle sensor SN1, the water temperature sensor SN2, the in-cylinder pressure sensor SN3, the airflow sensor SN4, and the first and second intake air temperature sensors SN5 and SN7, the first and second intake air pressure sensors SN6 and SN8, the differential pressure sensor SN9, and the linear $O_2$ sensor SN10 described above. The ECU 100 sequentially receives the information detected by these sensors (i.e., the crank angle, engine speed, engine water temperature, in-cylinder pressure, intake flow rate, intake air temperature, intake pressure, differential pressure before and after the EGR valve 53, oxygen concentration of exhaust gas, etc.).

Moreover, an accelerator sensor SN11 which detects an opening of an accelerator pedal operated by an operator who operates the vehicle is provided to the vehicle, and a detection signal from the accelerator sensor SN11 is also inputted into the ECU 100.

The ECU 100 controls the components of the engine, while performing various determinations and calculations based on the inputted signal from the respective sensors. That is, the ECU 100 is electrically connected to the intake VVT 13a, the exhaust VVT 14a, the injector 15, the spark plug 16, the swirl valve 18, the throttle valve 32, the electromagnetic clutch 34, the bypass valve 39, the EGR valve 53, etc., and outputs control signals to these components based on the calculation results. The ECU 100 is one example of a "controller."

(3) Control According to Operating State

Figure 5:
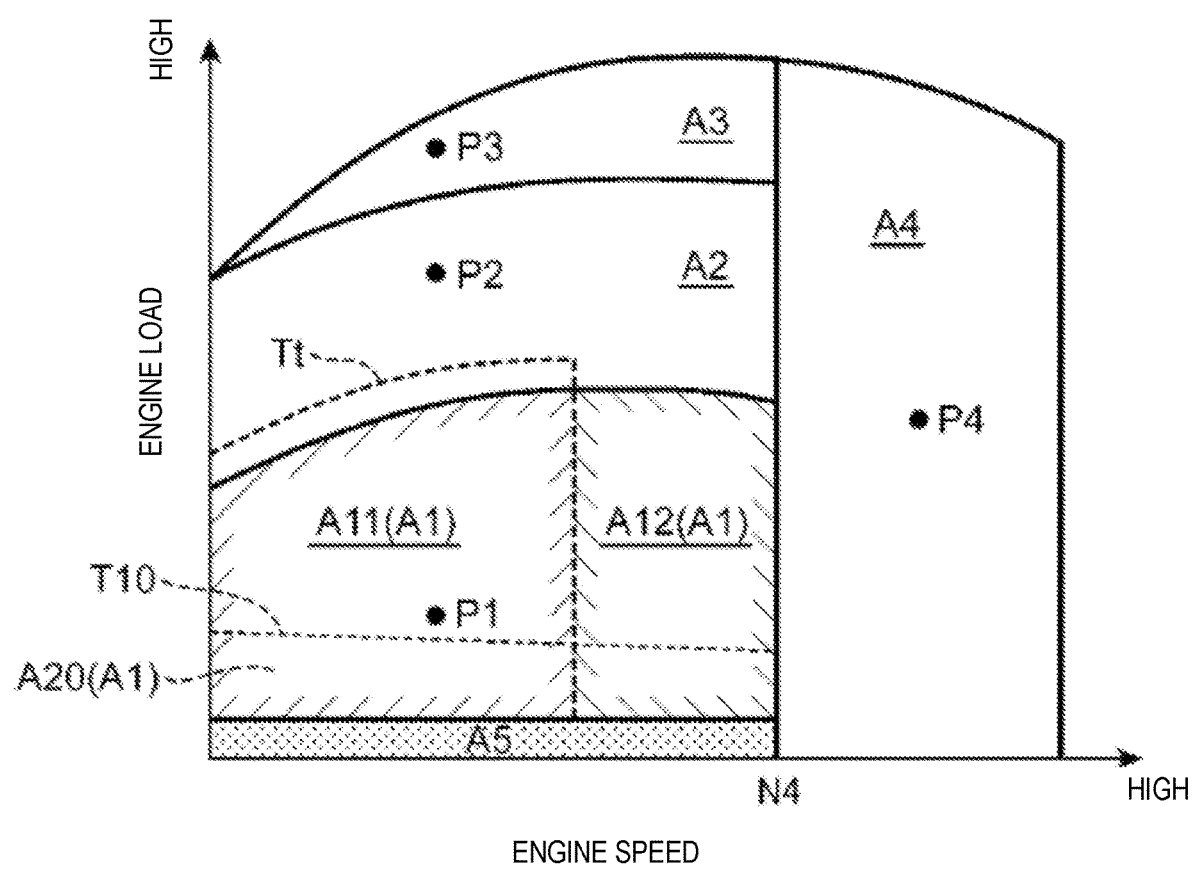
FIG. 5 is an operation map which classified an engine operating range by difference of a combustion mode.

FIG. 5 is an operation map used during an engine warm state in which a warm-up of the engine is completed, which illustrates a difference in control according to the engine speed and the load. Note that below, the phrase "the engine load is high (low)" as used herein is equivalent to a "required torque of the engine is high (low)."

As illustrated in FIG. 5, when the engine is in the warm state, the engine operating range can be roughly divided into five operating ranges A1-A5. Assuming a first divided range A1, a second divided range A2, a third divided range A3, a fourth divided range A4, and a reduced cylinder operating range A5, the fourth divided range A4 is a range where the engine speed is high, and the reduced cylinder operating range A5 is a range where the engine load is very low, the first divided range A1 is a range where a low-to-middle speed and low-load range which is obtained by subtracting the reduced cylinder operating range A5 and part of a high-load side from the range where the engine speed is lower than the fourth divided range A4, the third divided range A3 is a low-speed and high-load range where the engine speed is low and the load is high, and the second divided range A2 is the remaining range other than the reduced cylinder operating range A5, and the first, third, and fourth divided range A1, A3, and A4 (in other words, a combined range of a low-to-middle speed and middle-load range, and a middle-speed and high-load range). Below, the combustion mode selected for each operating range will be described in order.

Note that in the following description, although, as terms which specify the timing of fuel injection and spark ignition, terms such as "early stage," "middle stage," and "latter stage" of a certain stroke, and terms such as "early half" and "latter half" of a certain stroke may be used, these terms are defined based on the following premises. That is, here, three periods formed by evenly dividing any stroke, such as an intake stroke or a compression stroke, are defined as "early stage," "middle stage," and "latter stage" respectively. Thus, for example, (i) the early stage, (ii) the middle stage, and (iii) the latter stage of a compression stroke refers to respective ranges of (i) 180 to 120° CA before a compression top dead center (BTDC), (ii) 120 to 60° CA BTDC, and (iii) 60 to 0° CA BTDC. Similarly, here, two periods formed by evenly dividing any stroke, such as an intake stroke or a compression stroke, are defined as "early half" and "latter half" respectively. Thus, for example, (iv) the early half and (v) the latter half of the intake stroke refers to respective ranges of (iv) 360 to 270° CA BTDC and (v) 270 to 180° CA BTDC.

(3-1) First Divided Range

In the first divided range A1 with the low-to-middle speed and the low load, the SPCCI combustion which is a combination of the SI combustion and the CI combustion is performed. The SI combustion is a combustion mode in which the mixture gas is ignited by a spark generated from the spark plug 16, the mixture gas is forcibly combusted by flame propagation which expands the combustion range from the ignition point to the perimeter. The CI combustion is a combustion mode in which the mixture gas combusts by self-ignition under an environment where the temperature and pressure are increased by the compression of the piston 5. The SPCCI combustion which is a combination of the SI combustion and the CI combustion, is a combustion mode in which SI combustion of a portion of the mixture gas is carried out inside the combustion chamber 6 by spark ignition performed under an environment immediately before the mixture gas self-ignites, and CI combustion of the remaining mixture gas is carried out inside the combustion chamber 6 by self-ignition after the SI combustion (a further increase in the temperature and pressure accompanying SI combustion). Note that "SPCCI" is an abbreviation of "SPark Controlled Compression Ignition," and the SPCCI combustion is one example of "partial compression-ignition combustion.".

Figure 7:
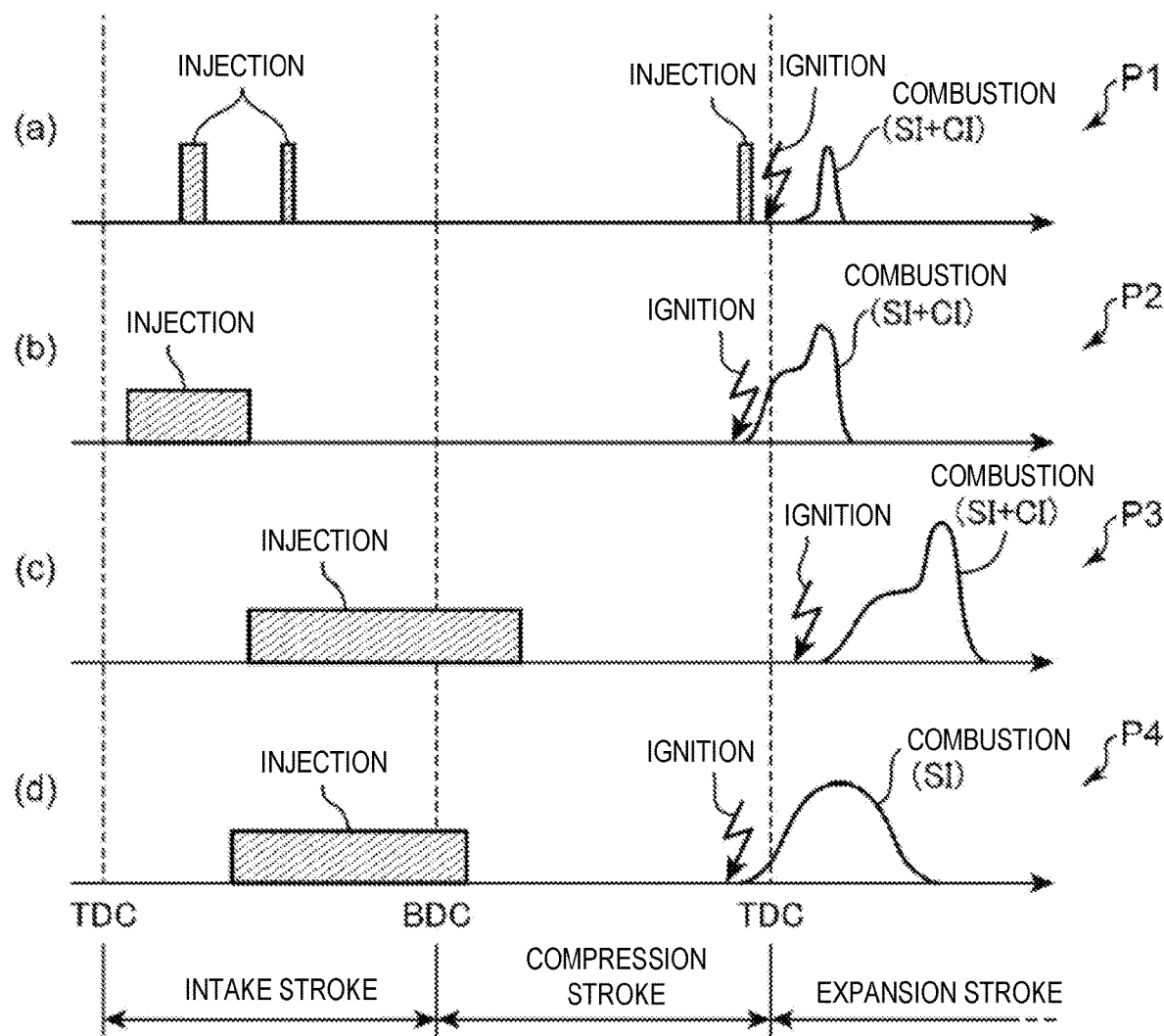
FIG. 7 is a time chart schematically illustrating a combustion control which is executed in each range.

SPCCI combustion has a characteristic in which the heat generation in the CI combustion is faster than the heat generation in the SI combustion. For example, in a waveform of a heat generation rate by the SPCCI combustion, a rising slope in an early stage of the combustion corresponding to the SI combustion becomes shallower than a rising slope caused corresponding to the subsequent CI combustion, as will be described later with reference to FIG. 7. In other words, the waveform of the heat generation rate during SPCCI combustion is formed so as to be continuous in the order of a first heat generation rate portion where the rising slope based on the SI combustion is relatively shallow, and a second heat generation rate portion where the rising slope based on the CI combustion is relatively steep. Moreover, corresponding to the tendency of such a heat generation rate, a pressure buildup rate $(dp/d\theta)$ inside the combustion chamber 6 caused during the SI combustion is lower than during the CI combustion, in the SPCCI combustion.

Figure 6:
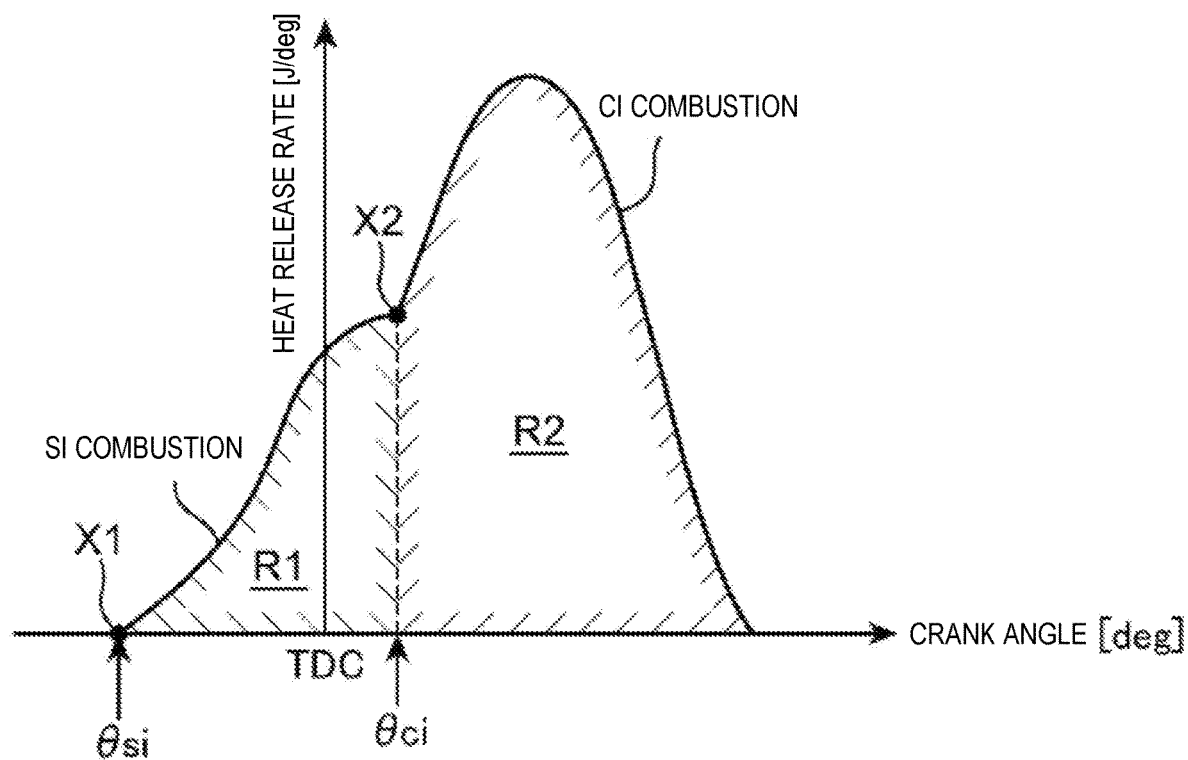
FIG. 6 is a graph illustrating a waveform of a heat generation rate during SPCCI combustion.

When the temperature and pressure inside the combustion chamber 6 are increased by SI combustion, unburnt mixture gas self-ignites in connection with this, and CI combustion is then started. As illustrated in FIG. 6, the slope of the waveform of the heat generation rate changes from shallow to steep at the timing of the self-ignition (i.e., a timing at which CI combustion starts). That is, the waveform of the heat generation rate in SPCCI combustion has a point of inflection (indicated by an "X2" in FIG. 6) which appears at the timing where CI combustion starts.

After the start of CI combustion, SI combustion and CI combustion are performed in parallel. Since the combustion velocity of the mixture gas in CI combustion is faster than that in SI combustion, the heat generation rate becomes relatively high. However, since CI combustion is performed after a compression top dead center, the slope of the waveform of the heat generation rate does not become excessive. That is, since the motoring pressure decreases due to the descent of the piston 5 after the compression top dead center, this reduces the increase in the heat generation rate, which avoids excessive $dp/d\theta$ during CI combustion. Thus, in SPCCI combustion, $dp/d\theta$ used as an index of combustion noise does not easily become excessive because of the characteristic in which CI combustion is performed after SI combustion, and combustion noise can be reduced compared to performing CI combustion alone (when carrying out CI combustion of all the fuel).

SPCCI combustion ends as CI combustion ends. Since the combustion velocity of CI combustion is faster than SI combustion, the combustion end timing is advanced compared to performing SI combustion alone (when carrying out SI combustion of all the fuel). In other words, in SPCCI combustion, the combustion end timing can be brought closer to the compression top dead center on the expansion stroke. Therefore, in SPCCI combustion, fuel efficiency can be improved compared to SI combustion alone.

In the first divided range A1, control is executed in which SPCCI combustion of the mixture gas is carried out, while making the air-fuel ratio (A/F) which is a weight ratio of air (fresh air: A) to fuel (F) inside the combustion chamber 6 higher than the stoichiometric air-fuel ratio (14.7:1), in order to reduce the amount of $NO_x$ generated by the combustion and to obtain a suitable fuel efficiency. That is, SPCCI combustion is performed, while an excess air factor $\lambda$ in the combustion chamber 6 is set to $\lambda>1$. The air-fuel ratio (A/F) in the first divided range A1 is set to 20 or higher so that the amount of NOx generated by the combustion becomes sufficiently small. For example, the air-fuel ratio (A/F) in the first divided range A1 is variably set within a range more than 20 and less than 35. A target air-fuel ratio in the first divided range A1 is substantially set to increase as the load (required torque) becomes higher.

In order to realize SPCCI combustion in such an environment in which the air-fuel ratio is set higher than the stoichiometric air-fuel ratio (hereinafter, may suitably be referred to as "the A/F lean environment"), each component of the engine is controlled by the ECU 100 as follows in the first divided range A1.

The injector 15 dividedly injects fuel a plurality of times from the intake stroke to the compression stroke. For example, at an operation point P1 where the engine speed is relatively low and the load is relatively low in the first divided range A1, the injector 15 injects a majority of the fuel for one cycle in two portions from the early stage to the middle stage of the intake stroke, and injects the remaining fuel in the a final stage of the compression stroke (a total of three injections), as illustrated in the chart (a) of FIG. 7.

The spark plug 16 ignites the mixture gas near a compression top dead center (TDC). For example, at the operation point P1, the spark plug 16 ignites the mixture gas at a slightly advanced timing than TDC of compression stroke. This ignition triggers SPCCI combustion, a portion of the mixture gas in the combustion chamber 6 combusts by flame propagation (SI combustion), and the remaining mixture gas then combusts by self-ignition (CI combustion).

The booster 33 is in an OFF state within a range of the boosting line Tt illustrated in FIG. 5, and in an ON state outside the range of the boosting line Tt. Inside the range of the boosting line Tt where the booster 33 is the OFF state, i.e., in a low-speed range of the first divided range A1, the electromagnetic clutch 34 is disengaged to release the connection of the booster 33 with the engine body 1, and the bypass valve 39 is fully opened to suspend the boost by the booster 33. On the other hand, a range outside the boosting line Tt where the booster 33 is in the ON state, i.e., in a high-speed range of the first divided range A1, the boost is performed by the booster 33 by engaging the electromagnetic clutch 34 to connect the booster 33 to the engine body 1. Here, the opening of the bypass valve 39 is controlled so that the pressure inside the surge tank 36 (boosting pressure) detected by the second intake pressure sensor SN8 is in agreement with a preset target pressure for every operating condition of the engine (such as the engine speed and the load). For example, as the opening of the bypass valve 39 increases, a flow rate of intake air which flows backward to an upstream side of the booster 33 through the bypass passage 38 increases, and as a result, the pressure of intake air introduced into the surge tank 36, i.e., the boosting pressure decreases. Thus, the bypass valve 39 adjusts the boosting pressure to the target pressure by adjusting an amount of the backward flow of intake air.

In the first divided range A1, in order to introduce a large amount of air into the combustion chamber 6 to increase the air-fuel ratio inside the combustion chamber 6 as described above, the throttle valve 32 is fully opened or nearly fully opened.

The intake VVT 13a and the exhaust VVT 14a are driven so that the open timing and the close timing of the intake valve 11 and the open timing and the close timing of the exhaust valve 12 become timings at which the amount of air inside the combustion chamber 6 becomes an appropriate amount, and a stable SPCCI combustion is realized. The detail will be described later.

The opening of the EGR valve 53 is adjusted so that the in-cylinder temperature suitable for acquiring the waveform of desired SPCCI combustion (a target SI ratio and a target θci which will be described later) is realized, in other words, the external EGR gas is introduced into the combustion chamber 6 by an amount required to reach the temperature. The detail will be described later.

The opening of the swirl valve 18 is adjusted so that a relatively strong swirl flow is formed inside the combustion chamber 6. The detail will be described later.

In the first divided range A1, a reduced-cylinder operation switching range A20 is set as a range where the engine load is lower than a preset reduced-cylinder operation switching load T10. In the reduced-cylinder operation switching range A20, a reduced-cylinder operation executing condition described later is satisfied, not all-cylinder operation is performed in which all the cylinders are operated, but a reduced-cylinder operation is performed in which only some of the cylinders are operated and the rest of the cylinders are stopped. The reduced-cylinder operation switching range A20 is one example of a "reduced cylinder range."

In this embodiment, two of the four cylinders are stopped and two cylinders are operated in the reduced-cylinder operation. For example, the injectors 15 of the non-operating cylinders (hereinafter, may suitably be referred to as "the paused cylinders") are stopped to suspend the supply of fuel into the paused cylinders, and only the injectors 15 of the operating cylinders are maintained to supply the fuel to only the operating cylinders.

The amount of the fuel supplied to each operating cylinder is set greater than the amount of the fuel supplied to each cylinder when carrying out the all-cylinder operation. On the other hand, the control described above is executed also in the reduced-cylinder operation, except for the amount of the fuel supplied to each cylinder, and specific open timings and close timings of the intake valves 11 and the exhaust valves 12 which will be described later. That is, each control of the injectors 15, the spark plugs 16, the throttle valves 32, the superchargers 33, the EGR valves 53, and the swirl valves 18 is carried out in the first divided range A1 regardless of all-cylinder operation or the reduced-cylinder operation. For example, in the first divided range A1, also during the reduced-cylinder operation, the air-fuel ratio in the operating cylinders is set higher than the stoichiometric air-fuel ratio ($\lambda>1$), and the injectors 15 and the spark plugs 16 are controlled as illustrated in the chart (a) of FIG. 7, similar to the all-cylinder operation, to execute SPCCI combustion.

Here, since it is necessary to make the air-fuel ratio of exhaust gas near the stoichiometric air-fuel ratio when $NO_x$ is purified by the three-way catalyst, it is necessary to suspend the intake valves 11 and the exhaust valves 12 of the paused cylinders in order to avoid the air flowing into the exhaust passage 40 and the air-fuel ratio of the exhaust gas becoming lean. On the other hand, in this embodiment, since the amount of $NO_x$ which is generated in the combustion chambers 6 where the air-fuel ratio of the operating cylinders is lean as described above is kept small, the necessity that the three-way catalyst purifies $NO_x$ is small. Thus, in this embodiment, during the reduced-cylinder operation, the intake valves 11 and the exhaust valves 12 of the paused cylinders are kept driven like during the all-cylinder operation. Thereby, it is not necessary to provide a mechanism for stopping the operation of the intake valves 11 and the exhaust valves 12 of the paused cylinders, and the structure of the control system can be simplified. The details of the reduced-cylinder operation executing condition etc. will be described later.

(3-2) Reduced Cylinder Operating Range

In the reduced cylinder operating range A5, the reduced-cylinder operation is always carried out, regardless of the operating condition. Note that, also in the reduced cylinder operating range A5, each control of the injector 15, the spark plug 16, the throttle valve 32, the booster 33, the EGR valve 53, and the swirl valve 18 is carried out, similar to the first divided range A1. For example, also in the reduced cylinder operating range A5, the air-fuel ratio of each cylinder is set higher than the stoichiometric air-fuel ratio, the injectors 15 and the spark plugs 16 are controlled as illustrated in the chart (a) of FIG. 7 to perform SPCCI combustion.

(3-3) Second Divided Range

In the second divided range A2, a control to carry out SPCCI combustion of the mixture gas is executed, while forming an environment in which a gas-fuel ratio (G/F) which is a weight ratio of all the gas to fuel inside the combustion chamber 6 is higher than the stoichiometric air-fuel ratio (14.7:1) and the air-fuel ratio (A/F) substantially equals to the stoichiometric air-fuel ratio (hereinafter, this is referred to as G/F-lean environment). For example, in order to realize SPCCI combustion under such a G/F-lean environment, in the second divided range A2, each component of the engine is controlled by the ECU 100 as follows.

The injector 15 performs at least one fuel injection during the intake stroke. For example, at an operation point P2 included in the second divided range A2, the injector 15 performs one fuel injection which supplies the entire amount of fuel to be injected in one cycle during the intake stroke, as illustrated in a chart (b) of FIG. 7.

The spark plug 16 ignites the mixture gas near a compression top dead center (TDC). For example, at the operation point P2, the spark plug 16 ignites the mixture gas at a slightly advanced timing than TDC of compression stroke. Then, this ignition triggers SPCCI combustion, a portion of the mixture gas in the combustion chamber 6 combusts by flame propagation (SI combustion), and the remaining mixture gas then combusts by self-ignition (CI combustion).

The opening of the throttle valve 32 is set to a valve opening so that an amount of air corresponding to the stoichiometric air-fuel ratio is introduced into the combustion chamber 6 through the intake passage 30, i.e., so that the air-fuel ratio (A/F) which is a weight ratio of air inside the combustion chamber 6 (fresh air: A) to fuel (F) substantially equals to the stoichiometric air-fuel ratio (14.7:1). On the other hand, in the second divided range A2, the EGR valve 53 is opened and external EGR gas is introduced into the combustion chamber 6. Thus, in the second divided range A2, the gas air-fuel ratio (G/F) which is a weight ratio of all the gas in the combustion chamber 6 to fuel becomes higher than the stoichiometric air-fuel ratio (14.7:1).

The booster 33 is in the OFF state in the low-load and low-speed part which overlaps with the range inside the boosting line Tt, and is in the ON state in other ranges. When the booster 33 is in the ON state and intake air is boosted, the opening of the bypass valve 39 is controlled so that the pressure inside the surge tank 36 (boosting pressure) is in agreement with the target pressure.

The EGR valve 53 is opened to a suitable opening so that a suitable amount of the external EGR gas for SPCCI combustion in the second divided range A2 is introduced into the combustion chamber 6. The intake VVT 13a and the exhaust VVT 14a set the valve timings of the intake valves 11 and the exhaust valves 12 so that a given length of the valve overlap period is formed. The opening of the swirl valve 18 is set to about the same opening in the first divided range A1, or set to a given middle opening larger than this.

(3-4) Third Divided Range

In the third divided range A3, control in which SPCCI combustion of the mixture gas is carried out under an environment where the air-fuel ratio in the combustion chamber 6 is slightly richer than the stoichiometric air-fuel ratio ($\lambda \leq 1$) is performed. For example, in order to realize SPCCI combustion under such a rich environment, each component of the engine is controlled by the ECU 100 in the third divided range A3 as follows.

The injector 15 injects all or a majority of the fuel to be injected in one cycle during the intake stroke. For example, at an operation point P3 included in the third divided range A3, the injector 15 injects fuel over a continuous period which overlaps with the latter half of the intake stroke, as illustrated in a chart (c) of FIG. 7, and in more detailed, a continuous period from the latter half of the intake stroke to the early half of the compression stroke.

The spark plug 16 ignites the mixture gas near a compression top dead center. For example, at the operation point P3, the spark plug 16 the ignites mixture gas at a slightly retarded timing than TDC of compression stroke.

The booster 33 is in the ON state, and the boost is performed by the booster 33. The boosting pressure at this time is adjusted by the bypass valve 39. The intake VVT 13a and the exhaust VVT 14a set the timings of the intake valve 11 and the exhaust valve 12 so that the internal EGR is substantially stopped. The throttle valve 32 is fully opened. The opening of the EGR valve 53 is controlled so that the air-fuel ratio (A/F) in the combustion chamber 6 becomes slightly richer than the stoichiometric air-fuel ratio ($\lambda \leq 1$). For example, the EGR valve 53 adjusts an amount of exhaust gas which recirculates through the EGR passage 51 (external EGR gas) so that the air-fuel ratio may become 12 or higher and 14 or lower. Note that the EGR valve 53 may be closed near the maximum load of the engine to substantially stop the external EGR.

The opening of the swirl valve 18 is set as a middle opening which is larger than the valve opening in the first and second ranges A1 and A2 and smaller than the opening equivalent to the fully-open state.

(3-5) Fourth Divided Range

In the fourth divided range A4, a traditional SI combustion is performed. In order to realize SI combustion, each component of the engine is controlled by the ECU 100 in the fourth divided range A4 as follows.

The injector 15 injects fuel over a given period which overlaps at least with the intake stroke. For example, at an operation point P4 included in the fourth divided range A4, the injector 15 injects fuel over a continuous period from the intake stroke to the compression stroke, as illustrated in a chart (d) of FIG. 7.

The spark plug 16 performs the spark ignition within a period from the latter half of the compression stroke to the early half of the expansion stroke. For example, at the operation point P4, the spark plug 16 performs the spark ignition in the latter half of the compression stroke, as illustrated in the chart (d) of FIG. 7. Then, this ignition triggers SI combustion and all of the mixture gas in the combustion chamber 6 combusts by flame propagation.

The booster 33 is in the ON state, and the boost is performed by the booster 33. The boosting pressure at this time is adjusted by the bypass valve 39. Respective openings of the throttle valve 32 and the EGR valve 53 are controlled so that the air-fuel ratio (A/F) in the combustion chamber 6 becomes the stoichiometric air-fuel ratio or slightly richer than the stoichiometric air-fuel ratio ($\lambda \leq 1$). The swirl valve 18 is fully opened.

(4) Setting of Open Timings and Close Timings of Intake Valve and Exhaust Valve in First Divided Range Next, the details of the open timings and the close timings of the intake valve 11 and the exhaust valve 12 which are performed in the first divided range A1 of FIG. 5 described above (the execution range of SPCCI combustion under A/F lean environment) will be described.

(4-1) Natural Aspiration A/F Lean Range

Figure 8:
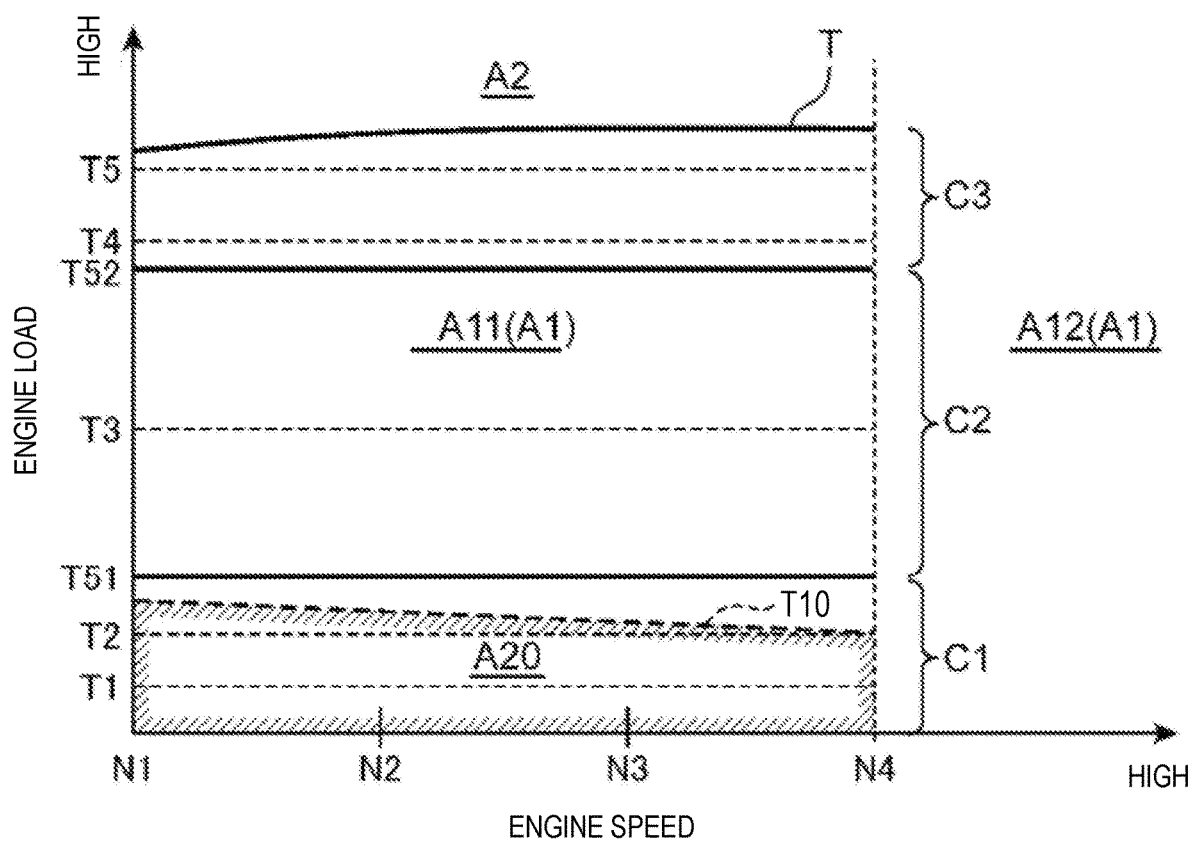
FIG. 8 is a partially enlarged view of FIG. 5.

FIG. 8 is part of FIG. 5, and is an enlarged view illustrating a range A11 inside a line T of the first divided range A1 and a range A12 where the boost is not performed by the booster 33 (hereinafter, may suitably be referred to as the "natural-aspiration A/F lean range").

(All-Cylinder Operation)

First, the open timings and the close timings of the intake valve 11 and the exhaust valve 12 during the all-cylinder operation is described, and the following description is based on the assumption that the engine is in the all-cylinder operation.

Figure 9:
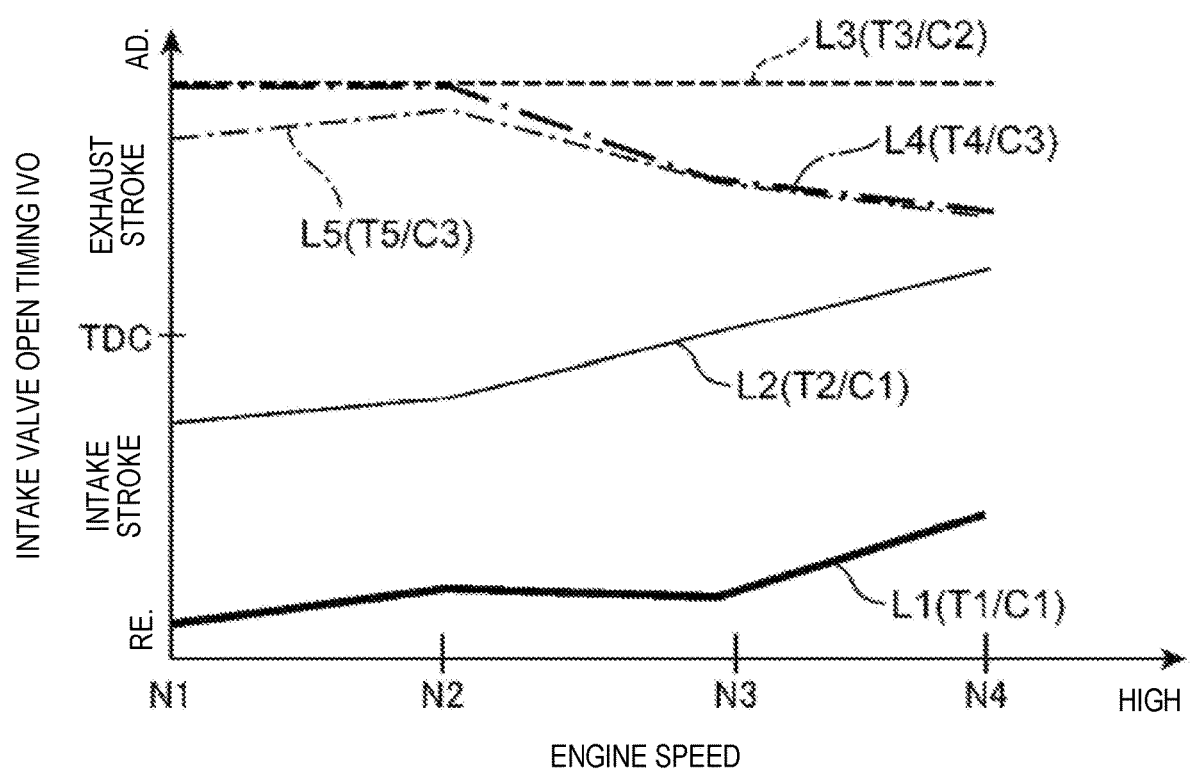
FIG. 9 is a graph illustrating one example of the open timing of the intake valve set in a natural-aspiration A/F lean range.
Figure 10:
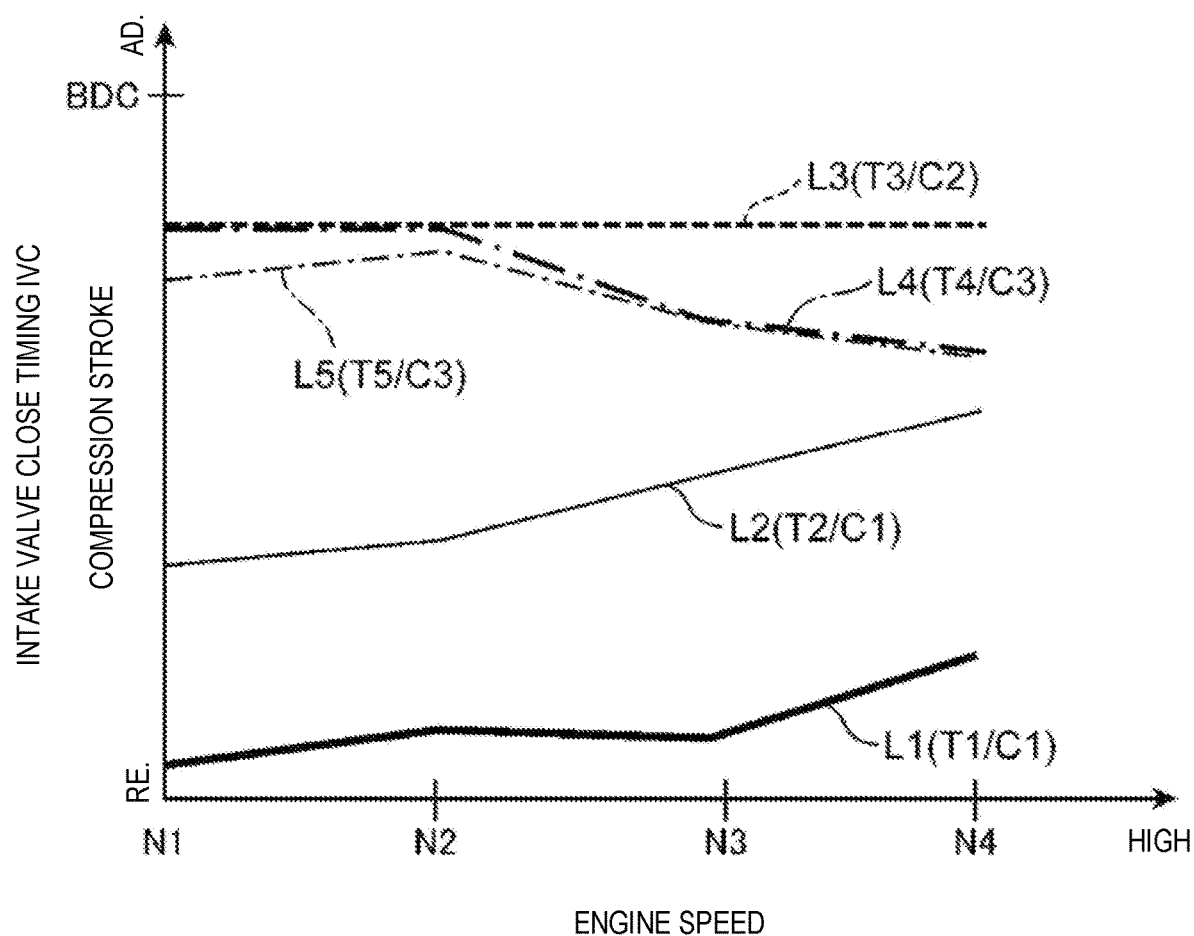
FIG. 10 is a graph illustrating one example of the close timing of the intake valve set in the natural-aspiration A/F lean range.

FIG. 9 is a graph illustrating one example of the open timing IVO of the intake valve 11 (during the all-cylinder operation) in the natural-aspiration A/F lean range A11. FIG. 10 is a graph illustrating one example of the close timing IVC of the intake valve 11 (during the all-cylinder operation) in the natural-aspiration A/F lean range. As described above, the intake valve 11 is changed in the open timing and the close timing while the valve opening period is fixed. Therefore, the close timing of the intake valve 11 changes similar to the valve open timing, according to the engine load and the engine speed.

FIG. 9 (FIG. 10) illustrates a graph where the horizontal axis is the engine speed and the vertical axis is the valve open timing IVO of the intake valve 11 (close timing IVC of the intake valve 11). Engine speeds N1, N2, N3, and N4 of the horizontal axis in FIG. 9 (FIG. 10) correspond to the engine speeds N1, N2, N3, and N4 of the horizontal axis in FIG. 8. Moreover, each of the lines L1, L2, L3, L4, and L5 in FIG. 9 (FIG. 10) is a line connecting the value of the open timing IVO (close timing IVC) of the intake valve 11 at operation points where the engine load is same, and these lines L1-L5 illustrate the open timing IVO (close timing IVC) of the intake valve when the engine load is a first load T1, a second load T2, a third load T3, a fourth load T4, and a fifth load T5 illustrated in FIG. 8, respectively.

The first load T1, the second load T2, the third load T3, the fourth load T4, and the fifth load T5 have a larger value in this order (i.e., T1>T2>T3>T4>T5). The lines L1 and L2 represent the engine speed and the open timing IVO (close timing IVC) of the intake valve 11 in a range where the engine load becomes near the first load T1 and the second load T2, i.e., a low load range C1 of the natural-aspiration A/F lean range A11 where the engine load is lower than a given first divided load T51 (hereinafter, may be referred to as the "low load A/F lean range"). The line L3 represents the engine speed and the open timing IVO (close timing IVC) of the intake valve 11 in a range where the engine load becomes near the third load T3, i.e., a middle load range C2 of the natural-aspiration A/F lean range A11 where the engine load becomes the first divided load T51 or higher, and less than a given second divided load T52 (hereinafter, may be referred to as the "middle load A/F lean range"). The lines L4 and L5 represent the engine speed and the open timing IVO (close timing IVC) of the intake valve 11 in a range where the engine load becomes near the fourth load T4 and the fifth load T5, i.e., a high load range C3 of the natural-aspiration A/F lean range A11 where the engine load becomes the second divided load T52 or higher (hereinafter, may be referred to as the "high load A/F lean range").

The low load A/F lean range C1 is an example of a "first operating range," the middle load A/F lean range C2 is an example of a "second operating range," and the high load A/F lean range C3 is an example of a "third operating range."

(Open and Close Timings of Intake Valve)

As illustrated in FIG. 10, in the natural-aspiration A/F lean range A11, the close timing IVC of the intake valve 11 is set to a more retarded side of the intake BDC, regardless of the engine load and the engine speed.

As illustrated by the lines L3 of FIG. 9 and FIG. 10, in the middle load A/F lean range C2, the open timing IVO and the close timing IVC of the intake valve 11 are fixed, regardless of the engine speed and the engine load. In this embodiment, the open timing IVO and the close timing IVC of the intake valve 11 in the middle load A/F lean range C2 is set at the most advanced timing (timing on the most advanced side within the changeable range). As described above, the most advanced timing of the open timing IVO of the intake valve 11 is timing at the advanced side of the exhaust TDC.

As illustrated by the lines L1 and L2 in FIGS. 9 and 10, each of the open timing IVO and the close timing IVC of the intake valve 11 are set to the more retarded side of the most advanced timing in the low load A/F lean range C1. Further, in the low load A/F lean range C1, the close timing IVC of the intake valve 11 is set to the retarded side of an intake maximum valve close timing at which the amount of air enclosed inside the combustion chamber 6 becomes the largest when the intake valve 11 is closed. That is, in the low load A/F lean range C1, the intake valve 11 is closed exceeding the intake maximum valve close timing. In connection with this, in the low load A/F lean range C1, a portion of air is blown back to the intake port 9A from the inside of the combustion chamber 6 in a period from the intake maximum valve close timing to the time when the intake valve 11 is closed.

In the low load A/F lean range C1, each of the open timing IVO and the close timing IVC of the intake valve 11 are set at a more retarded timing as the engine speed decreases.

Here, when the close timing IVC of the intake valve 11 is retarded within a range on the retarded side of an intake maximum valve close timing IVC1, the amount of air blown back to the intake port 9A from the inside of the combustion chamber 6 increases. Therefore, in the low load A/F lean range C1, the amount of air inside the combustion chamber 6 decreases as the engine speed decreases. Thus, in this embodiment, in the low load A/F lean range C1, the valve close timing IVC1 of the intake valve 11 is more retarded as the engine speed decreases within a range where the amount of air inside the combustion chamber 6 (cylinder 2) is reduced by this retarding of the valve close timing IVC1.

As being clear from the comparison of the lines L1 and L2 in FIGS. 9 and 10, in the low load A/F lean range C1, the open timing IVO and the close timing IVC of the intake valve 11 are set at a more retarded timing as the engine load decreases for every engine speed.

As illustrated by the lines L4 and L5 in FIGS. 9 and 10, each of the open timing IVO and the close timing IVC of the intake valve 11 is set to a more retarded side of the most advanced timing in the high load A/F lean range C3. Note that the retarded amount is relatively small, and the open timing IVO of the intake valve 11 is set at timing on the advanced side of the exhaust TDC.

In the high load A/F lean range C3, the relation between the engine speed and the open timing IVO of the intake valve differ at a high engine speed side and a low engine speed side bordering on the second speed N2.

For example, in a partial range of the high load A/F lean range C3 where the engine speed is higher (the engine speed is the second speed N2 or higher), the close timing IVC of the intake valve 11 is set so as to be substantially in agreement with the intake maximum valve close timing (the close timing IVC of the intake valve 11 when the amount of air enclosed inside the combustion chamber 6 when the intake valve 11 is closed becomes the largest). Here, the intake maximum valve close timing is more retarded as the engine speed increases by an action of the inertia of intake air. Thus, in a partial range of the high load A/F lean range C3 where the engine speed is higher, each of the open timing IVO and the close timing IVC of the intake valve 11 are set to a more retarded timing, at which more air is introduced into the combustion chamber 6 (cylinder 2) by the action of inertia, as the engine speed increases. Note that the second speed N2 is set beforehand.

On the other hand, in a partial range of the high load A/F lean range C3 where the engine speed is lower (the engine speed is lower than the second speed N2), the open timing IVO and the close timing IVC of the intake valve 11 are fixed or set on the more advanced side as the engine speed increases. In detail, as illustrated by the line L4, in a partial range of the high load A/F lean range C3 where the engine load is lower, the open timing IVO and the close timing IVC of the intake valve 11 are fixed to a certain value, regardless of the engine speed, when the engine speed is less than the second speed N2. On the other hand, as illustrated by the line L5, in a partial range of the high load A/F lean range C3 where the engine load is higher, each of the open timing IVO and the close timing IVC of the intake valve 11 is more advanced as the engine speed increases, when the engine speed is less than the second speed N2.

(Opening and Closing Timings of Exhaust Valve)

Figure 11:
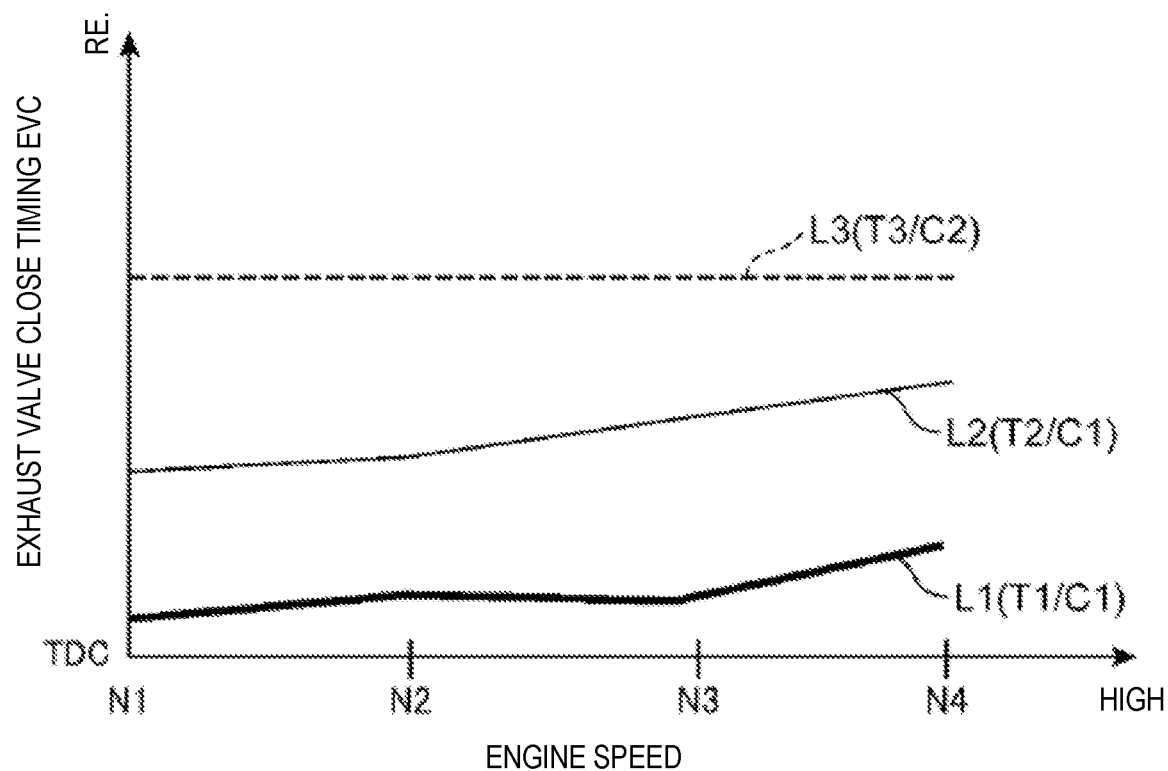
FIG. 11 is a graph illustrating one example of the close timing of the exhaust valve set in the natural-aspiration A/F lean range.
Figure 12:
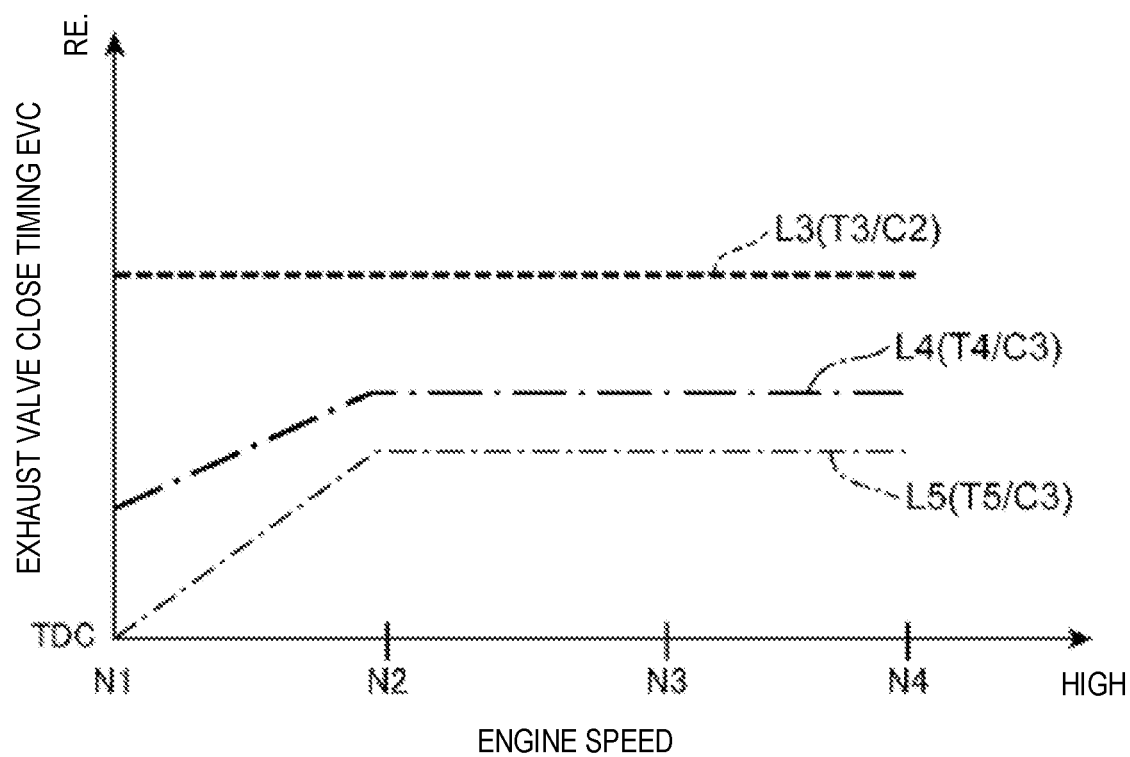
FIG. 12 is a graph illustrating one example of the close timing of the exhaust valve set in the natural-aspiration A/F lean range.

FIGS. 11 and 12 are graphs illustrating one example of the close timing EVC of the exhaust valve 12 when the all-cylinder operation is carried out in the natural-aspiration A/F lean range A11. FIGS. 11 and 12 are graphs corresponding to FIGS. 9 and 10, and lines L1-L5 in FIGS. 11 and 12 indicate the close timing EVC of the exhaust valve 12 when the engine load is the first load T1 to the fifth load T5, respectively. Note that in order to clarify the lines, FIG. 11 illustrates the lines L1-L3, and FIG. 12 illustrates the lines L3-L5.

As illustrated in FIGS. 11 and 12, in the natural-aspiration A/F lean range A11, the close timing EVC of the exhaust valve 12 is set to a more retarded side of the exhaust TDC throughout this range. That is, in the natural-aspiration A/F lean range A11, the exhaust valve 12 is closed substantially after the exhaust TDC. Thus, in connection with the exhaust valve 12 being opened even after the exhaust TDC, burnt gas once drawn out to the exhaust port 10 is fundamentally re-introduced into the combustion chamber 6 in the natural-aspiration A/F lean range A11.

As illustrated by the lines L3 in FIGS. 11 and 12, in the middle load A/F lean range C2, the open timing IVO and the close timing IVC of the intake valve 11 are fixed, regardless of the engine speed and the engine load. In this embodiment, the close timing EVC of the exhaust valve 12 in the middle load A/F lean range C2 is set at the most advanced timing (the most advanced timing within the changeable range).

As illustrated by the lines L1 and L2 in FIG. 11, in the low load A/F lean range C1, the close timing EVC of the exhaust valve 12 is substantially set on a more advanced side as the engine speed decreases.

As illustrated by the lines L4 and L5 in FIG. 12, in the high load A/F lean range C3, the close timing EVC of the exhaust valve 12 is set to the more retarded side as the engine speed increases. For example, in the high load A/F lean range C3, in a range where the engine speed is lower than the second speed N2, the close timing EVC of the exhaust valve 12 is retarded with the increase in the engine speed, and in a range where the engine speed is the second speed N2 or higher, the close timing EVC of the exhaust valve 12 is fixed, regardless of the engine speed.

Note that as described above, the exhaust valve 12 is changed in the open and close timings while the opening period is fixed, and the open timing of the exhaust valve 12 changes similar to the close timing of the exhaust valve 12, according to the engine load and the engine speed.

(Reduced-Cylinder Operation)

Next, the open timings and the close timings of the intake valve 11 and the exhaust valve 12 during the reduced-cylinder operation are described.

First, a reduced-cylinder operation executing condition which is a condition for carrying out the reduced-cylinder operation in the reduced-cylinder operation switching range A20 is described.

When switching between the all-cylinder operation and the reduced-cylinder operation, the engine torque may vary by changing the number of operating cylinders. Thus, in this embodiment, in order to reduce the frequency of switching between the all-cylinder operation and the reduced-cylinder operation, even when the engine is operated in the reduced-cylinder operation switching range A20, the reduced-cylinder operation is carried out only when shifting from the reduced cylinder operating range A5 to the reduced-cylinder operation switching range A20, and then remaining in the reduced-cylinder operation switching range A20 after the transition. Therefore, even when the engine is operated in the reduced-cylinder operation switching range A20, the all-cylinder operation is carried out when shifting to the reduced-cylinder operation switching range A20 from a range other than the reduced cylinder operating range A5 and the reduced-cylinder operation switching range A20, and when remaining in the reduced-cylinder operation switching range A20 after the transition. Thus, in this embodiment, it is determined that the reduced-cylinder operation executing condition is satisfied, when shifting from the reduced cylinder operating range A5 to the reduced-cylinder operation switching range A20, when remaining in the reduced-cylinder operation switching range A20 after the transition, and when the reduced-cylinder operation is currently carried out.

Figure 13:
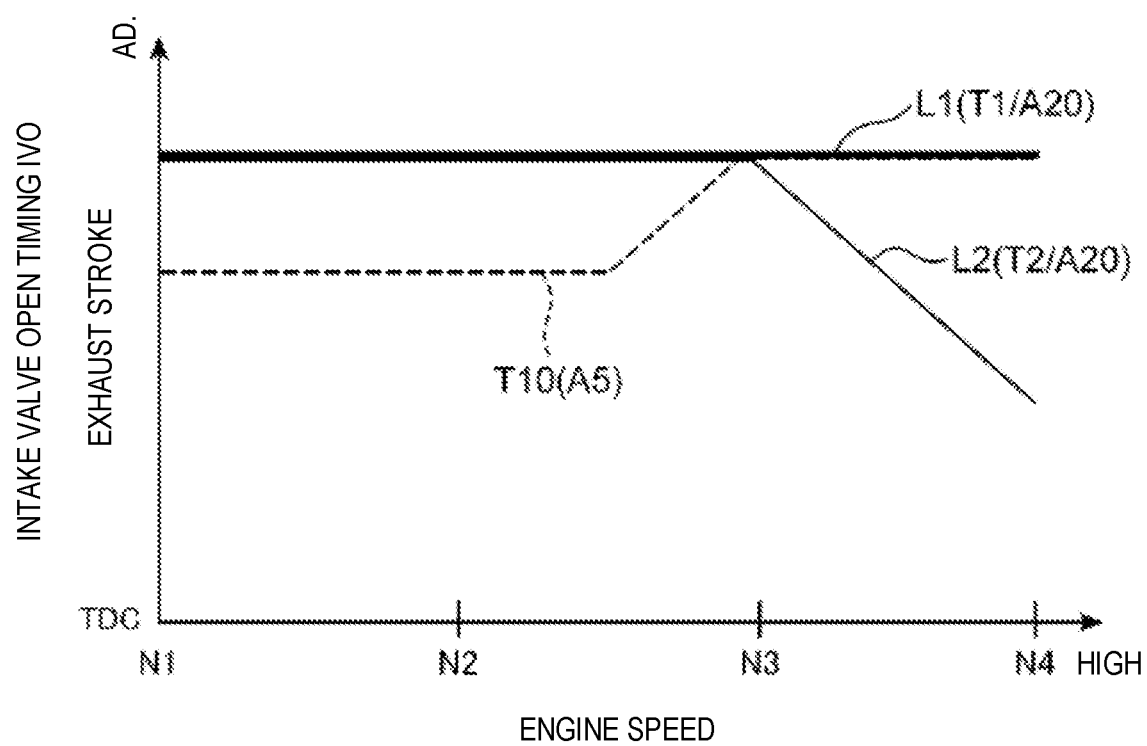
FIG. 13 is a graph illustrating one example of the open timing of the intake valve set in a reduced cylinder range.
Figure 14:
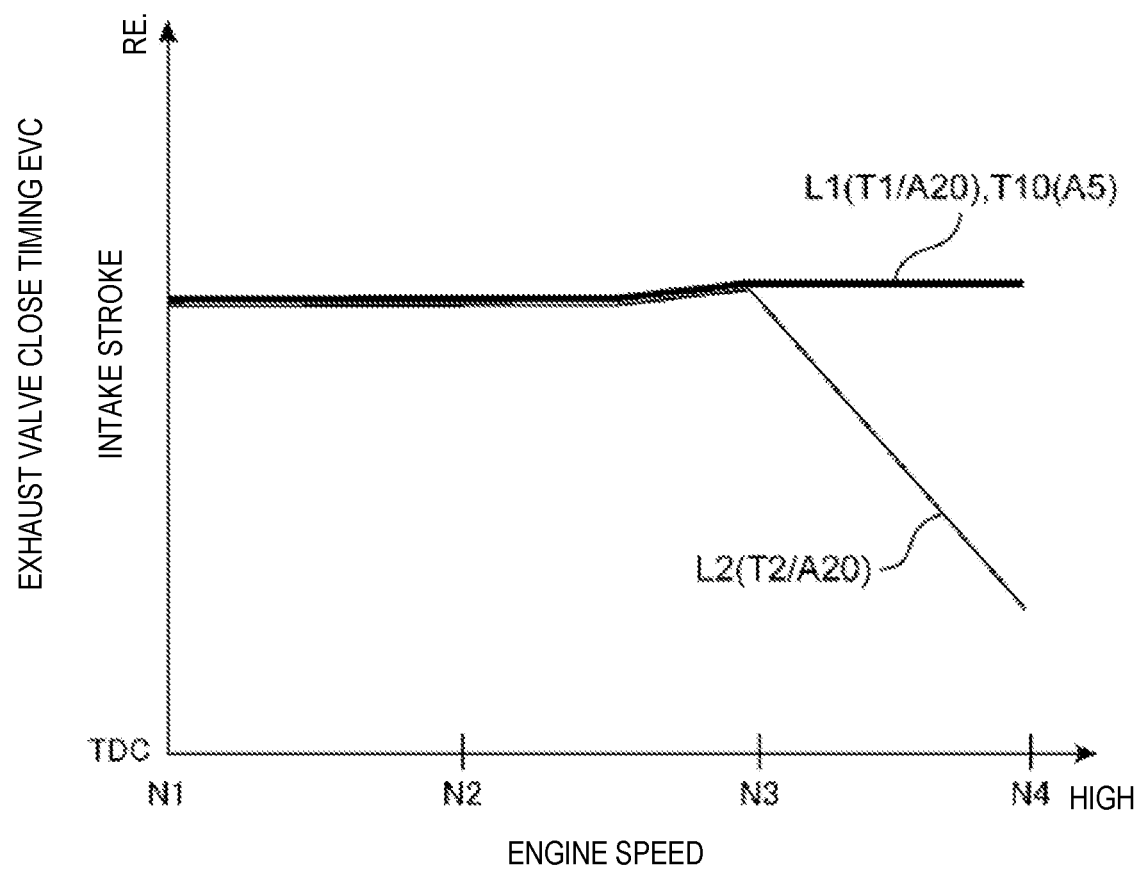
FIG. 14 is a graph illustrating one example of the close timing of the exhaust valve set in the reduced cylinder range.

FIG. 13 is a graph illustrating one example of the open timing IVO of the intake valve 11 when the reduced-cylinder operation is carried out in the reduced-cylinder operation switching range A20. FIG. 14 is a graph illustrating one example of the close timing EVC of the exhaust valve 12 when the reduced-cylinder operation is carried out in the reduced-cylinder operation switching range A20. The lines L1 and L2 in FIGS. 13 and 14 illustrate the open timing IVO of the intake valve 11 and the close timing EVC of the exhaust valve 12 when the engine load is the first load T1 and the second load T2 illustrated in FIG. 8, respectively. Note that in FIG. 13, the open timing IVO of the intake valve 11 in the reduced cylinder operating range A5 is illustrated by a broken line.

As illustrated by the line L1 in FIG. 13, when carrying out the reduced-cylinder operation, the open timing IVO of the intake valve 11 is fixed, regardless of the engine speed, in a partial range of the reduced-cylinder operation switching range A20 where the engine load is low. In this embodiment, the open timing IVO of the intake valve 11 is fixed at the most advanced timing.

On the other hand, as illustrated by the line L2 in FIG. 13, the open timing IVO of the intake valve 11 is set to the more retarded side as the engine speed increases in a partial range of the reduced-cylinder operation switching range A20 where the engine load is higher, when carrying out the reduced-cylinder operation. For example, on the higher engine load side, when the engine speed is the third speed N3 or lower, the open timing IVO of the intake valve 11 is fixed at the most advanced timing, regardless of the engine speed, and when the engine speed becomes higher than the third speed N3, the open timing IVO of the intake valve 11 is more retarded as the engine speed increases. When carrying out the reduced-cylinder operation, in a partial range of the reduced-cylinder operation switching range A20 where the engine load is higher, the close timing IVC of the intake valve 11 is also set to the more retarded side as the engine speed increases. In detail, the close timing IVC of the intake valve 11 is retarded in connection with the increase in the engine speed within a range where the amount of air inside the combustion chamber 6 increases by retarding the valve close timing IVC.

Moreover, as illustrated by the line L1 in FIG. 14, when carrying out the reduced-cylinder operation, the close timing EVC of the exhaust valve 12 is also substantially fixed, regardless of the engine speed, in a partial range of the reduced-cylinder operation switching range A20 where the engine load is lower.

As illustrated by the line L2 in FIG. 14, when carrying out the reduced-cylinder operation, the close timing EVC of the exhaust valve 12 is set at a more advanced timing the engine speed increases in a partial range of the reduced-cylinder operation switching range A20 where the engine load is higher. For example, in the higher engine load side, although the close timing EVC of the exhaust valve 12 is substantially fixed, regardless of the engine speed when the engine speed is the third speed N3 or lower, when the engine speed becomes higher than the third speed N3, the close timing EVC of the exhaust valve 12 is more advanced as the engine speed increases.

(4-2) Boosting A/F Lean Range

In a partial range of the first divided range A1, which is a range A12 outside the line T where the boost is performed by the booster 33 (hereinafter, may suitably be referred to as a boosting A/F lean range), the valve opening period of the intake valve 11 and the valve opening period of the exhaust valve 12 overlap with each other having a compression top dead center therebetween, and the open timing and the close timing of these valves 11 and 12 are set so that both the intake valve 11 and the exhaust valve 12 are opened during a period from a timing on the advanced side of a compression top dead center to a timing on the retarded side of the compression top dead center. By setting in this way, purge of the combustion chamber 6 is stimulated and a large amount of air is introduced into the combustion chamber 6.

(5) Setting of External EGR Rate

Next, the details of the external EGR performed in the first divided range A1 will be described.

In the first divided range A1, the target external EGR rate is variably set substantially within a range of 0 to 20%, and this value is set higher as the engine speed or the engine load increases. Note that the term "external EGR rate" as used herein refers to a weight ratio of exhaust gas which is recirculated to the combustion chamber 6 through the EGR passage 51 (external EGR gas) occupying in all the gas in the combustion chamber 6.

The ECU 100 adjusts the opening of the EGR valve 53 so that, during operation in the first divided range A1, the external EGR gas amount corresponding to the target external EGR rate set as described above is recirculated to the combustion chamber 6 through the EGR passage 51.

(6) Swirl Control

A swirl control in the first divided range A1 will be described.

In the first divided range A1, the opening of the swirl valve 18 is set as a low opening which is lower than a half-open (50%). Thus, by reducing the opening of the swirl valve 18, intake air introduced into the combustion chamber 6 is mostly comprised of intake air from the first intake port 9A (the intake port without the swirl valve 18), and a strong swirl flow is formed in the combustion chamber 6. This swirl flow grows during the intake stroke, and remains up to the middle of the compression stroke to stimulate the stratifying of the fuel. That is, a concentration difference where the fuel concentration in the central part of the combustion chamber 6 is thicker than an area outside the central part (perimeter part) is formed. For example, in the first divided range A1, the air-fuel ratio in the central part of the combustion chamber 6 is set 20 or higher and 30 or lower by the action of the swirl flow, and the air-fuel ratio in the perimeter part of the combustion chamber 6 is set 35 or higher.

In the first divided range A1, the target swirl valve opening is variably set substantially within a range of 20 to 40%, and this value is set higher as the engine speed or the engine load increases. The ECU 100 controls the opening of the swirl valve 18 according to the map of the target swirl valve opening set as described above, during operation in the first divided range A1.

In this embodiment, the opening of the swirl valve 18 is set lower during operation in the first divided range A1 as the engine speed and the engine load are lower and, thus, the swirl flow is strengthened accordingly (as the engine speed and the engine load become lower).

That is, in this embodiment, although fuel is radially injected from the injector 15 disposed in the central part of the ceiling surface of the combustion chamber 6, each fuel spray of the injected fuel is carried by the swirl flow and moves toward the central part of the combustion chamber 6. At this time, since the swirl flow remains until a later time of the compression stroke as the opening of the swirl valve 18 is smaller (in other words, as an initial velocity of the swirl flow is faster), the mixture gas with a higher fuel concentration is formed in the central part of the combustion chamber 6 immediately before a start of the combustion, and as a result, the stratification of the mixture gas is stimulated. Utilizing this, in this embodiment, the opening of the swirl valve 18 is reduced to strengthen the swirl flow as the engine speed and the engine load are lower in the first divided range A1, thereby improving the stratification and ignitability of the mixture gas.

Here, when the opening of the swirl valve 18 in the engine of this embodiment is 40%, the swirl ratio slightly exceeds 1.5, and when the swirl valve 18 is fully closed (0%), the swirl ratio increases to about 6. Note that the swirl ratio is defined as a value obtained by dividing an integrated value of measurements of a lateral angular velocity of the intake air flow for every valve lift by an angular velocity of the crankshaft. As described above, the opening of the swirl valve 18 is controlled substantially within a range of 20 to 40% during operation in the first divided range A1. Thereby, in this embodiment, it can be said that the opening of the swirl valve 18 in the first divided range A1 is set as the value so that the swirl ratio in the combustion chamber 6 becomes 1.5 or more.

(7) SI Ratio

As described above, in this embodiment, SPCCI combustion which is a combination of SI combustion and CI combustion is performed in the first divided range A1 and the second divided range A2, and in this SPCCI combustion, it is important to control a ratio of SI combustion and CI combustion according to the operating condition.

Here, in this embodiment, as this ratio, a SI ratio which is a ratio of the amount of heat generation by SI combustion to the total amount of heat generation by SPCCI combustion (SI combustion and CI combustion) is used. FIG. 6 is a view illustrating the SI ratio, and illustrates a change in a heat generation rate (J/deg) when SPCCI combustion occurs, according to the crank angle. A point X1 in the waveform of FIG. 6 is a heat generation point from which the heat generation rate rises with the start of SI combustion, and a crank angle θsi corresponding to the heat generation point X1 is defined as a start timing of SI combustion. Moreover, the point X2 in this waveform is a point of inflection which appears when the combustion mode changes from SI combustion to CI combustion, and the crank angle θci corresponding to this point of inflection X2 is defined as a start timing of CI combustion. Further, a waveform area R1 of the heat generation rate located at the advanced side of θci which is the start timing of CI combustion (from θsi to θci) is defined as an amount of heat generation by SI combustion, and a waveform area R2 of the heat generation rate located on the retarded side of θci is defined as an amount of heat generation by CI combustion. Thus, the SI ratio which is defined by [amount of heat generation by SI combustion]/[amount of heat generation by SPCCI combustion] described above can be expressed by R1/(R1+R2) using the areas R1 and R2. That is, in this embodiment, SI ratio=R1/(R1+R2).

In CI combustion, since the mixture gas combusts simultaneously by self-ignition, the pressure buildup rate tends to be higher, compared with SI combustion by flame propagation. For this reason, particularly, if the SI ratio is decreased (i.e., the ratio of CI combustion is increased) under a condition where the load is high and the fuel injection amount is large, loud noise will occur. On the other hand, since CI combustion does not occur unless the combustion chamber 6 fully increases in temperature and pressure, CI combustion will not be started under a condition where the load is low and the fuel injection amount is small unless SI combustion progresses to some extent, and therefore, the SI ratio becomes inevitably high (i.e., the ratio of CI combustion decreases). In consideration of such a situation, in this embodiment, the target SI ratio which is a target value of the SI ratio is defined beforehand for every engine operating condition in the operating range where SPCCI combustion is performed (i.e., the first and second divided ranges A1 and A2). For example, the target SI ratio in the first divided range A1 at the low load side is set so as to be substantially smaller as the load increases (i.e., the ratio of CI combustion increases as the load increases). On the other hand, the target SI ratio in the second divided range A2 at the high load side is set so as to be substantially larger as the load increases (i.e., the ratio of CI combustion decreases). Further, corresponding to this, in this embodiment, the target θci which is the start timing of CI combustion when combustion which suits the target SI ratio is performed is also defined beforehand for every engine operating condition.

In order to realize the target SI ratio and the target θci described above, it is necessary to adjust controlled variables, such as main timing of ignition by the spark plug 16, the injection amount/injection timing of fuel from the injector 15, and the EGR rate (the external EGR rate and the internal EGR rate), for every operating condition. For example, more fuel combusts by SI combustion as the main timing of ignition is advanced, thereby increasing the SI ratio. Moreover, more fuel combusts by CI combustion as the injection timing of fuel is advanced, thereby decreasing the SI ratio. Alternatively, more fuel combusts by CI combustion as the in-cylinder temperature increases with an increase of the EGR rate, thereby decreasing the SI ratio. Further, since the change in the SI ratio is accompanied by the change in θci, a change in each controlled variable (the main ignition timing, the fuel injection timing, the EGR rate, etc.) serves as an element to adjust θci.

Based on the above tendencies, in this embodiment, the main ignition timing, the injection amount/injection timing of fuel, the EGR rate (as a result, the in-cylinder temperature), etc. are controlled to become a combination which can realize the target SI ratio and the target θci as described above, when performing SPCCI combustion.

(8) Operation and Effects

As described above, in this embodiment, in the natural-aspiration A/F lean range A11, SPCCI combustion is performed, while the air-fuel ratio is set higher than the stoichiometric air-fuel ratio. SI combustion (in detail, the flame propagation) tends to be unstable if the air-fuel ratio is increased. If SI combustion becomes unstable, the temperature in the combustion chamber 6 cannot be fully increased near the compression top dead center. Therefore, the amount of the mixture gas which carries out CI combustion decreases and a larger amount of the mixture gas combusts by flame propagation with a long combustion period, or CI combustion takes place when the piston descends considerably, and as a result, fuel efficiency decreases. In this regard, in this embodiment, in the natural-aspiration A/F lean range A11, by setting the open and close timings of the intake valve 11 and the open and close timings of the exhaust valve 12 as described above, the internal EGR gas and air suitably exist in the combustion chamber 6 at respective operation points within the natural-aspiration A/F lean range A11. Thus, the stability of SI combustion is increased even under the A/F lean environment, and CI combustion occurs near the compression top dead center to realize the suitable SPCCI combustion. Therefore, fuel efficiency can certainly be improved.

Specifically, due to the temperature inside the combustion chamber 6 being low when the engine load is low, and the number of combustion per unit time being small when the engine speed is low, the flame propagation especially is difficult to be stable.

In this regard, in this embodiment, in the low load A/F lean range C1 (first operating range), the close timing IVC of the intake valve 11 is retarded as the engine speed decreases within the range on the retarded side of the intake maximum valve close timing and where the amount of air inside the combustion chamber 6 is reduced by retarding the close timing IVC of the intake valve 11 (see the lines L1 and L2 in FIGS. 9 and 10). Thus, during operation in the low engine speed side of the low load A/F lean range C1, the amount of air inside the combustion chamber 6 is reduced and the air-fuel ratio in the combustion chamber 6 is reduced (richer) so that the stability of SI combustion improves. On the other hand, on the high engine speed side, the amount of air inside the combustion chamber 6 is increased to increase the air-fuel ratio in the combustion chamber 6 so that fuel efficiency improves.

Moreover, in this embodiment, in the low load A/F lean range C1, the close timing EVC of the exhaust valve 12 is advanced as the engine speed decreases within the range on the retarded side of the exhaust TDC (see the lines L1 and L2 in FIG. 11). That is, during operation in the low engine speed side of the low load A/F lean range C1, the valve opening period of the exhaust valve 12 after the exhaust TDC is shortened. Thus, during operation in the low engine speed side of the low load A/F lean range C1, the burnt gas discharged from the combustion chamber 6 to the exhaust port 10 is prevented from being reintroduced into the combustion chamber 6, and the amount of burnt gas (i.e., inert gas) left inside the combustion chamber 6 is reduced. Therefore, in the range, a reaction of fuel and air is stimulated to accelerate (stabilize) SI combustion, and accordingly, a more suitable CI combustion (SPCCI combustion) is realized to improve fuel efficiency.

Moreover, in this embodiment, in the middle load A/F lean range C2 (second operating rang), the open timing IVO of the intake valve 11 is fixed regardless of the engine speed (see the line L3 in FIGS. 9 and 10). In the middle load A/F lean range C2, the engine load is relatively high and combustion stability is easy to be secured. Thus, in such a middle load A/F lean range C2, unlike the low load A/F lean range C1, it is not necessary to retard the close timing of the intake valve with respect to the engine speed decreasing. Therefore, by fixing the open timing IVO of the intake valve 11 regardless of the engine speed as described above, in the middle load A/F lean range C2, fuel efficiency is improved by making the amount of air, and the air-fuel ratio inside the cylinder larger while combustion stability is secured. In addition, in the middle load A/F lean range C2, controllability of the intake valve 11 improves. That is, when the open timing and the close timing of the intake valve need to be greatly changed according to the change in the engine speed, although there is a possibility that the open timing of the intake valve may be shifted from the suitable timing due to the response delay of the variable intake mechanism, etc., this can be avoided in this embodiment. Similarly, in the middle load A/F lean range C2 (second operating rang), since the close timing EVC of the exhaust valve 12 is fixed regardless of the engine speed (see the line L3 in FIG. 11), controllability of the exhaust valve 12 also improves.

Moreover, in this embodiment, in the high engine speed side of the high load A/F lean range C3 (third operating range), the close timing IVC of the intake valve 11 is retarded as the engine speed increases within the range where the amount of air inside the cylinder increases by retarding the close timing IVC of the intake valve 11 (see the lines L4 and L5 in FIGS. 9 and 10). Thus, in the high engine speed side of the high load A/F lean range C3 (third operating range) where inertia of intake air is usable, the introduction of air into the cylinder is stimulated and the air-fuel ratio of the mixture gas is reliably set higher than the stoichiometric air-fuel ratio. Especially in this embodiment, on the high engine speed side of the high load A/F lean range C3, since the close timing IVC of the intake valve 11 is set so as to be substantially in agreement with the intake maximum valve close timing (the close timing IVC of the intake valve 11 when the amount of air enclosed inside the combustion chamber 6 when the intake valve 11 is closed becomes the largest), the large amount of air is further reliably introduced into the combustion chamber 6.

Here, when the engine load is comparatively high, if the close timing IVC and the open timing IVO of the intake valve 11 are excessively advanced, the temperature inside the combustion chamber 6 may be excessively increased. That is, the high load A/F lean range C3 is the range where the engine load is high, where the temperature of burnt gas becomes high. If the open timing IVO of the intake valve 11 is advanced, the amount of burnt gas discharged to the intake port 9 and then re-introduced into the combustion chamber 6 increases. Thus, when the close timing IVC and the open timing IVO of the intake valve 11 are excessively advanced in the high load A/F lean range C3, the temperature inside the combustion chamber 6 may be excessively increased. When the temperature inside the combustion chamber 6 becomes excessively high, CI combustion starts earlier than the desired timing which increases combustion noise.

In this regard, in this embodiment, on the low engine speed range of in the high load A/F lean range C3 (lower than the second speed), the open timing IVO of the intake valve 11 is fixed regardless of the engine speed or advanced as the engine speed increases. Thus, the increase of combustion noise is avoided while the amount of air introduced into the combustion chamber 6 is secured.

Moreover, in this embodiment, it is possible to carry out the reduced-cylinder operation when operating in the reduced-cylinder operation switching range A20 set to the part on the low load side of the low load A/F lean range C1. Therefore, combustion stability can certainly be improved in the low load side of the low load A/F lean range C1. For example, in the reduced-cylinder operation, the amount of fuel supplied to one cylinder (the operating cylinder) under the condition where the engine load is the same is increased more than that in the all-cylinder operation. Therefore, the temperature in the operating cylinder is increased to stabilize the combustion.

Here, it is necessary to also increase the amount of air introduced into the operating cylinders because of the amount of fuel supplied to the combustion chamber 6 being increased when the engine load is comparatively high in the reduced-cylinder operation. On the other hand, in this embodiment, when the reduced-cylinder operation is carried out within the higher load range of the reduced-cylinder operation switching range A20, the open timing IVO of the intake valve 11 is controlled to be on the retarded side within a range on the advanced side of the exhaust TDC as the engine speed increases. Therefore, within the higher load range of the reduced-cylinder operation switching range A20, the amount of burnt gas re-introduced into the operating cylinders after once being flowed into the intake ports is reduced to stimulate the introduction of air. When the reduced-cylinder operation is carried out on the higher load range of the reduced-cylinder operation switching range A20, the close timing IVC of the intake valve 11 is retarded as the engine speed increases within the range where the amount of air inside the combustion chamber 6 increases by retarding the valve close timing. Thus, the introduction of air into the combustion chamber 6 is stimulated using the inertia of intake air, thereby more certainly introducing the suitable amount of air into the operating cylinders.

Moreover, in the embodiment, when performing SPCCI combustion, since the main timing of ignition by the spark plug 16 is adjusted so that the SI ratio which is the ratio of the amount of heat generation by SI combustion to the total amount of heat generation in one cycle becomes in agreement with the preset target SI ratio according to the engine operating condition, the ratio of CI combustion can be increased as much as possible (i.e., the SI ratio is lowered) within a range where, for example, combustion noise does not become excessive. This leads to improving thermal efficiency by SPCCI combustion as much as possible.

(9) Modifications

In the above embodiment, in the middle load A/F lean range C2, although the case where the close timing IVC of the intake valve 11 is fixed, regardless of the engine speed is described, the control of the close timing IVC of the intake valve 11 in the middle load A/F lean range C2 is not limited to this configuration. For example, also in the middle load A/F lean range C2 the close timing IVC of the intake valve 11 may be controlled to be more retarded as the engine speed increases, similar to the low load A/F lean range C1. However, as described above, in the middle load A/F lean range C2, combustion stability is easy to be secured. If the close timing IVC of the intake valve 11 is excessively retarded, the amount of air inside the combustion chamber 6 may decrease too much. Therefore, even if the close timing IVC of the intake valve 11 is controlled to be more retarded as the engine speed increases in the middle load A/F lean range C2, the rate of change in the close timing IVC of the intake valve 11 to the engine speed is desirable to be set smaller than the rate of change in the close timing IVC of the intake valve 11 to the engine speed in the low load A/F lean range C1 to secure a large amount of air inside the combustion chamber 6 and to increase the air-fuel ratio. Moreover, if the rate of change is set smaller, controllability of the intake valve 11 can also be further improved.

Moreover, in the embodiment, although the SI ratio which is the ratio of the amount of heat generation by SI combustion to the total amount of heat generation by SPCCI combustion is defined as R1/(R1+R2) by using the areas R1 and R2 in the combustion waveform of FIG. 6, and the main timing of ignition is adjusted so that the SI ratio become in agreement with the preset target SI ratio, other various methods of defining the SI ratio can be considered.

For example, the SI ratio may be as follow.

SI ratio=$R1/R2$

Figure 15:
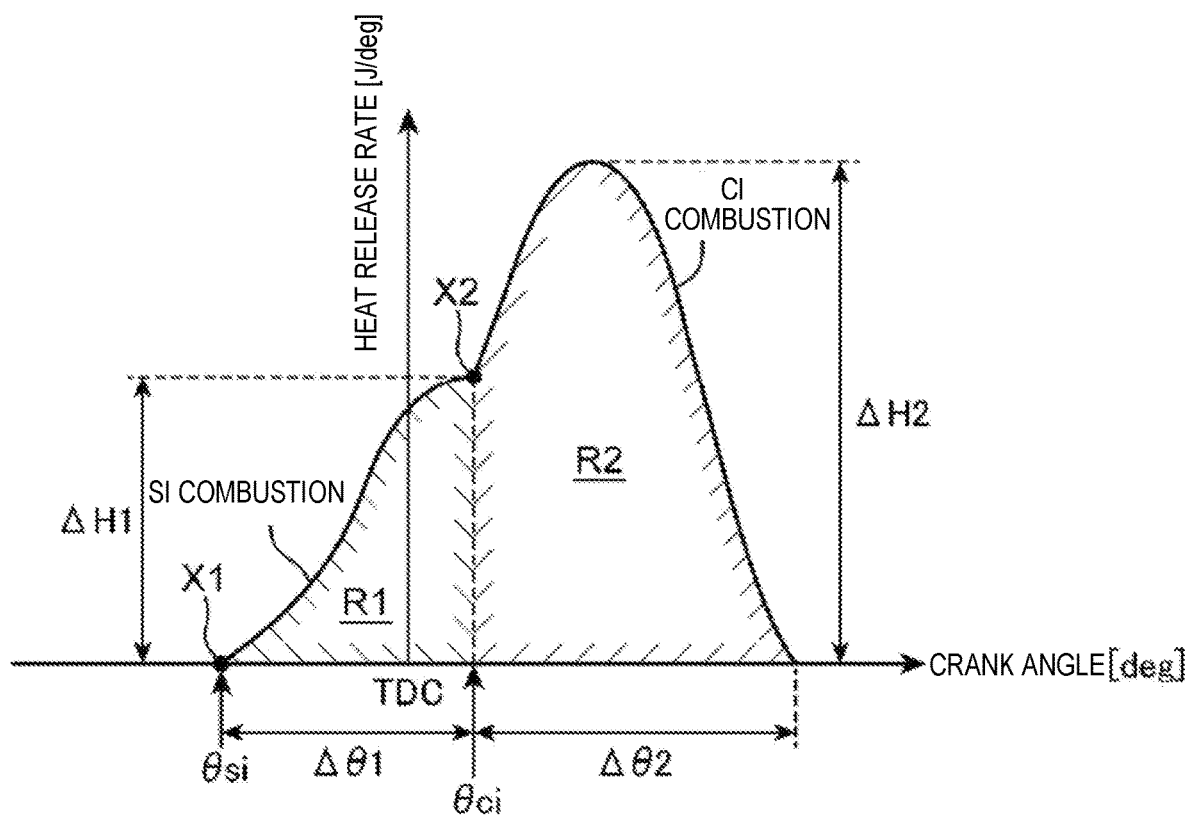
FIG. 15 is a view corresponding to FIG. 6, illustrating various methods of defining an SI ratio.

Further, the SI ratio may be defined using $\Delta\theta 1$ and $\Delta\theta 2$ which are illustrated in FIG. 15. That is, when the crank angle period of SI combustion (a combustion period on the advanced side of the point of inflection X2) is set as $\Delta\theta 1$, and the crank angle period of CI combustion (a combustion period at the retarded side of the point of inflection X2) is set as $\Delta\theta 2$, the SI ratio may be as follows.

SI ratio=$\Delta\theta 1/(\Delta\theta 1+\Delta\theta 2)$ or

SI ratio=$\Delta\theta 1/\Delta\theta 2$

Alternatively, when a peak of the heat generation rate of SI combustion is set as $\Delta H1$, and a peak of the heat generation of CI combustion is set as $\Delta H2$, the SI ratio may be as follow.

SI ratio=$\Delta H1/(\Delta H1+\Delta H2)$ or

SI ratio=$\Delta H1/\Delta H2$

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

2 Cylinder
11 Intake Valve
12 Exhaust Valve
13a Intake VVT (Intake Variable Mechanism)
14a Exhaust VVT (Exhaust Variable Mechanism)
15 Injector
16 Spark Plug
32 Throttle Valve
40 Exhaust Passage
100 ECU (Controller)

What is claimed is:

1. A control system of a compression-ignition engine including a cylinder, an intake passage, an exhaust passage, an intake port communicating the intake passage to the cylinder, an intake valve configured to open and close the intake port, an exhaust port communicating the exhaust passage to the cylinder, an exhaust valve configured to open and close the exhaust port, an injector configured to inject fuel into the cylinder, and a spark plug configured to ignite a mixture gas containing the fuel injected by the injector and air, the engine performs partial compression-ignition combustion in which the mixture gas is spark-ignited with the spark plug to be partially combusted by spark ignition (SI) combustion and the remaining mixture gas self-ignites to be combusted by compression ignition (CI) combustion, comprising:

a variable intake mechanism configured to change an open timing and a close timing of the intake valve; and
a controller including a processor configured to control parts of the engine, including the variable intake mechanism and the spark plug,
wherein when the engine is operated at least in a given first operating range, the controller controls the variable intake mechanism so that an air-fuel ratio (A/F) lean environment where an air-fuel ratio that is a ratio of air to fuel in the cylinder becomes higher than a stoichiometric air-fuel ratio is formed, while causing the spark plug to perform spark ignition at a given timing so that the mixture gas combusts by the partial compression-ignition combustion, and the controller controls the variable intake mechanism so that, under the same engine load condition, the close timing of the intake valve is more retarded as the engine speed decreases, within a range where an amount of air inside the cylinder decreases by retarding the valve close timing.

2. The control system of claim 1, wherein the variable intake mechanism simultaneously changes the open timing and the close timing of the intake valve.

3. The control system of claim 1, wherein
the controller controls the variable intake mechanism and the spark plug so that the partial compression-ignition combustion under the A/F lean environment is performed when the engine is operated in a second operating range set to the high load side of the first operating range, and
the controller controls the variable intake mechanism so that the close timing of the intake valve is more retarded as the engine speed increases under the same engine load condition, and a rate of change in the valve close timing becomes smaller than the rate of change in the first operating range, or controls the variable intake mechanism so that the close timing of the intake valve is fixed, regardless of the engine speed.

4. The control system of claim 3, wherein
the controller controls the variable intake mechanism and the spark plug so that the partial compression-ignition combustion under the A/F lean environment is performed when the engine is operated in a third operating range set to a higher load side of the second operating range, and the controller controls the variable intake mechanism in a partial range of the third operating range where the engine speed is higher so that the close timing of the intake valve is more retarded as the engine speed increases, within a range where the amount of air inside the cylinder increases by retarding the valve close timing.

5. The control system of claim 4, wherein the controller controls the variable intake mechanism in a partial range of the third operating range where the engine speed is lower, so that the close timing of the intake valve is fixed, regardless of the engine speed, or so that the close timing of the intake valve is advanced as the engine speed increases.

6. The control system of claim 1, further comprising a variable exhaust mechanism configured to change a close timing of the exhaust valve, wherein the controller controls the variable exhaust mechanism so that, when the engine is operated in the first operating range, the close timing of the exhaust valve is more advanced within a range on a retarded side of an exhaust top dead center as the engine speed decreases.

7. The control system of claim 1, wherein the cylinder includes a plurality of cylinders, and wherein the controller controls the variable intake mechanism so that, when the engine is operated in a reduced cylinder range set as at least part of the first operating range, and a preset reduced-cylinder operation executing condition is satisfied, a reduced-cylinder operation is carried out in which only some of the cylinders are operated by injecting fuel from the injector into the cylinders, while suspending the fuel injection into the remaining cylinders, and when the reduced-cylinder operation is carried out within a higher load range of the reduced cylinder range, the close timing of the intake valve is more retarded as the engine speed increases within a range where the amount of air inside the cylinder increases by retarding the valve close timing.

8. The control system of claim 7, wherein the controller controls an exhaust variable mechanism configured to change the close timing of the exhaust valve so that, when the reduced-cylinder operation is carried out in a higher load range of the reduced cylinder range, the close timing of the exhaust valve is more advanced as the engine speed increases within a range on a retarded side of an exhaust top dead center.

9. The control system of claim 1, wherein the controller sets a target SI ratio that is a target value of a ratio of an amount of heat generation by SI combustion to a total amount of heat generation in one cycle according to an engine operating condition when performing the partial compression-ignition combustion, and sets an ignition timing of the spark plug based on the target SI ratio.

* * * * *